(12) United States Patent
Sotzing

(10) Patent No.: US 8,753,542 B2
(45) Date of Patent: Jun. 17, 2014

(54) THERMALLY STABLE CONDUCTING POLYMERS, METHODS OF MAKING, AND METHODS OF USE THEREOF

(75) Inventor: Gregory A. Sotzing, Mansfield Center, CT (US)

(73) Assignee: The University of Connecticut, Farmington, CT (US)

( * ) Notice: Subject to any disclaimer, the term of this patent is extended or adjusted under 35 U.S.C. 154(b) by 524 days.

(21) Appl. No.: 13/004,141

(22) Filed: Jan. 11, 2011

(65) Prior Publication Data

US 2011/0168951 A1    Jul. 14, 2011

Related U.S. Application Data

(60) Provisional application No. 61/335,882, filed on Jan. 13, 2010, provisional application No. 61/316,923, filed on Mar. 24, 2010.

(51) Int. Cl.
*H01B 1/00* (2006.01)
*C08G 75/00* (2006.01)
*C08G 73/00* (2006.01)
*C08G 73/06* (2006.01)

(52) U.S. Cl.
USPC ............ 252/500; 528/377; 528/422; 528/423

(58) Field of Classification Search
USPC ................ 252/500–521.6; 528/377, 422, 423
See application file for complete search history.

(56) References Cited

U.S. PATENT DOCUMENTS

| | | | |
|---|---|---|---|
| 5,035,926 A | 7/1991 | Jonas et al. | |
| 5,482,655 A * | 1/1996 | Vogel et al. | ............ 252/500 |
| 7,157,548 B2 | 1/2007 | Lee et al. | |
| 7,309,456 B2 | 12/2007 | Yoshikawa et al. | |
| 2005/0154119 A1* | 7/2005 | Robeson et al. | ............. 524/502 |
| 2005/0267264 A1 | 12/2005 | Takei et al. | |
| 2007/0191576 A1 | 8/2007 | Sotzing | |
| 2008/0096093 A1* | 4/2008 | Jang et al. | ...................... 429/42 |

FOREIGN PATENT DOCUMENTS

| | | | |
|---|---|---|---|
| JP | 2007002135 A | * | 1/2007 |
| WO | 2011088010 A2 | | 7/2011 |

OTHER PUBLICATIONS

"Template polymerization of Conducting Polymers Using Sulfonated Poly(amic acids)," Polymer Preprints, 51(2), 569 (Fall 2010).*
PCT/US2011/020760 International Search Report for International Application No. PCT/US2011/020760; International Filing Date Jan. 11, 2011; Date of Mailing Oct. 28, 2011; 6 pages.
PCT/US2011/020760 Written Opinion for International Application No. PCT/US2011/020760; International Filing date Jan. 11, 2011; Date of Mailing Oct. 28, 2011; 5 pages.

* cited by examiner

*Primary Examiner* — Harold Pyon
*Assistant Examiner* — Jaison Thomas
(74) *Attorney, Agent, or Firm* — Cantor Colburn LLP

(57) ABSTRACT

Disclosed herein are thermally stable conducting polymers prepared by template polymerization of a conducting monomer in the presence of a sulfonated poly(amic acid). The resulting conducting polymer-sulfonated poly(amic acid) complex can be thermally converted to a conducting polymer-sulfonated poly(imide) complex having high thermal stability and high conductivity. Also disclosed are articles prepared from the thermally stable conducting polymer.

18 Claims, No Drawings

THERMALLY STABLE CONDUCTING POLYMERS, METHODS OF MAKING, AND METHODS OF USE THEREOF

CROSS-REFERENCE TO RELATED APPLICATIONS

This application claims the benefit of U.S. Provisional Application Ser. No. 61/335,882, filed Jan. 13, 2010; and claims the benefit of U.S. Provisional Application Ser. No. 61/316,923, filed Mar. 24, 2010, both of which are incorporated herein by reference in their entirety.

TECHNICAL FIELD

The present invention is in the field of conducting polymers, and more specifically, in the field of conducting polymers having high thermal stability.

BACKGROUND

Conducting polymers have been used in a wide range of applications where they provide such advantages as light weight, high conductivity and electrochromic properties. Such properties render the conducting polymers suitable for a variety of applications including organic light emitting diodes (OLEDs), organic photovoltaic devices (OPVs), capacitors, and sensors.

Poly(3,4-ethylenedioxythiophene) (PEDOT) is a known conducting polymer exhibiting a high conductivities, ranging from $10^{-2}$ to $10^5$ S/cm. As PEDOT is insoluble in many common solvents, it is prepared by template polymerization with a polyanion, poly(styrene sulfonic acid) (PSSA). PSSA is a charge-balancing dopant during polymerization in water which allows for the formation of a colloidal dispersion of poly(3,4-ethylenedioxythiophene)-poly(styrenesulfonic acid) or PEDOT-PSS. PEDOT-PSS is commercially available and has desirable properties, such as high stability in the p-doped form, high conductivity, good film formation, and excellent transparency in the doped state. PEDOT-PSS dispersed in water can be spin-coated to result in transparent films.

However, PEDOT-PSS lacks thermal stability at high temperatures. PEDOT-PSS can only be annealed at 180° C. for a few minutes and annealing beyond 200° C. causes a marked decrease in conductivity, rendering it an insulator rather than a conducting polymer. Therefore, PEDOT-PSS has limited use for high-temperature processing or high-temperature applications.

There remains a need in the art for conducting polymers having both high electrical conductivity as well as high thermal stability.

BRIEF SUMMARY

In one embodiment, a conducting polymer comprises a conducting polymer-sulfonated poly(imide) complex; or a conducting polymer-sulfonated poly(amic acid) complex.

In yet another embodiment, a method of making a conducting polymer comprises polymerizing a conducting monomer in the presence of a sulfonated poly(amic acid) and an oxidant to form a dispersion comprising a conducting polymer-sulfonated poly(amic acid) complex.

In still another embodiment, a method of making a conducting polymer comprises polymerizing a conducting monomer in the presence of a sulfonated poly(amic acid) and an oxidant to form a dispersion comprising a conducting polymer-sulfonated poly(amic acid) complex; and annealing the conducting polymer-sulfonated poly(amic acid) complex to form a conducting polymer-sulfonated poly(imide) complex.

Also described herein are use of the polymer-sulfonated poly(amic acid) complex and polymer-sulfonated poly(imide) complex described herein.

DETAILED DESCRIPTION

Disclosed herein are conducting polymer-sulfonated poly(imide) complexes which exhibit both high conductivity and high thermal stability. The conducting polymer-sulfonated poly(imide) complexes can be formed from the corresponding conducting polymer-sulfonated poly(amic acid).

Poly(imide)s are advantageous for their good thermal stability, high mechanical strength, good film forming ability, and good chemical resistance. By forming a conducting polymer-poly(imide) complex, using the corresponding poly (amic acid) as a template, a highly conductive and highly thermally stable polymeric system can be formed, which could also exhibit good adhesion to a poly(imide) dielectric material, particularly upon heat treatment.

Also disclosed herein is a method for template polymerization of a conducting monomer (e.g., 3,4-ethylenedioxythiophene (EDOT)) with a sulfonated poly(amic acid) (SPAA) to result in a stable conducting polymer-sulfonated poly(amic acid) colloidal dispersion. The polymerization can be conducted in aqueous systems, and films can be prepared from the dispersion. The sulfonated poly(amic acid) in the films, upon heating (annealing) at a temperature greater than about 150° C., undergo a morphology change due to imidization. The imidization results in an increase in conductivity of the polymeric film. For example, in films of PEDOT-SPAA, the sulfonated poly(amic acid) template undergoes imidization within ten minutes at temperatures greater than 150° C., resulting in PEDOT-sulfonated poly(imide) (PEDOT-SPI) with 10-fold conductivity enhancement. This material is highly thermally stable as compared to PEDOT-PSS.

Still further disclosed herein is a method of converting a conducting polymer-sulfonated poly(amic acid) to a conducting polymer-sulfonated poly(imide).

Additionally disclosed herein are uses for the conducting polymer-sulfonated poly(amic acid) and conducting polymer-sulfonated poly(imide) complexes.

The sulfonated poly(imide) generally comprises a structure (A)

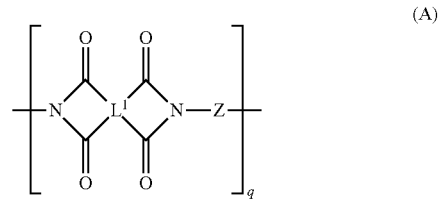

wherein $L^1$ is a linking group; typically the $L^1$ group comprises an arylene or substituted arylene;

Z is a group comprising one, two, or more sulfonic acid groups; typically the Z group comprises an arylene or substituted arylene; and q is about 10 to about 1000, specifically about 25 to about 800, yet more specifically about 40 to about 600, and yet more specifically about 100 to about 300. Exemplary $L^1$ groups include

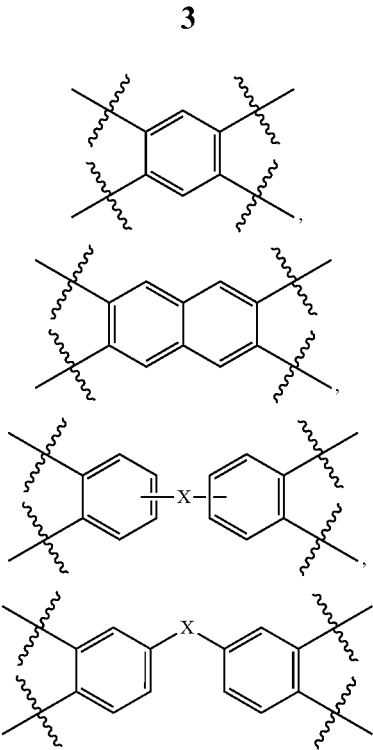

wherein X is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O); specifically $C_1$-$C_3$ alkyl, $CH_2$, $CH_2CH_2$, O, $C(CF_3)_2$, $CH_2OCH_2$, S(=O), S(=O)$_2$, C(=O), $CH_2S(=O)CH_2$, or $CH_2S(=O)_2CH_2$.

Exemplary Z groups include

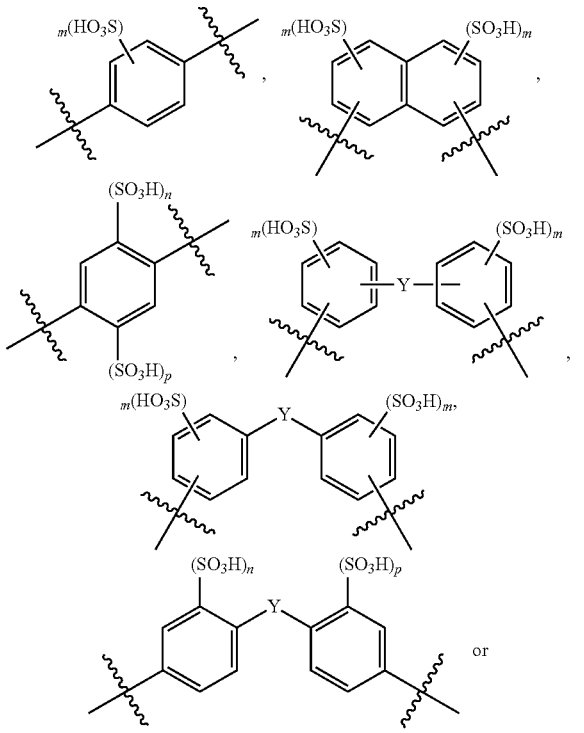

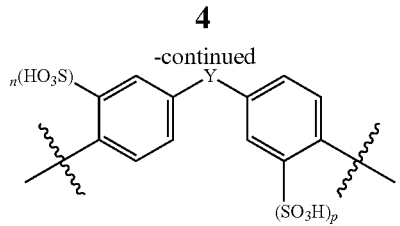

wherein n is 1; m is 0, 1, or 2 with the proviso that the diamine comprises at least one sulfonic acid group; p is 0 or 1; and Y is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O); specifically $C_1$-$C_3$ alkyl, $CH_2$, $CH_2CH_2$, O, $C(CF_3)_2$, $CH_2OCH_2$, S(=O), S(=O)$_2$, C(=O), $CH_2S(=O)CH_2$, or $CH_2S(=O)_2CH_2$.

The corresponding sulfonated poly(amic acid) generally has the structure (B)

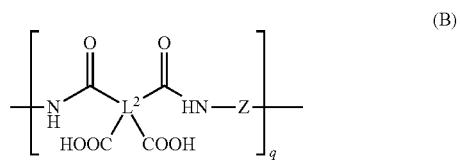

wherein $L^2$ is a linking group comprising a COOH group capable of reaction with a N in the polymer backbone to form an imide; typically $L^2$ comprises an arylene or substituted arylene; Z is as previously described, and q is as previously described.

Exemplary $L^2$ groups include

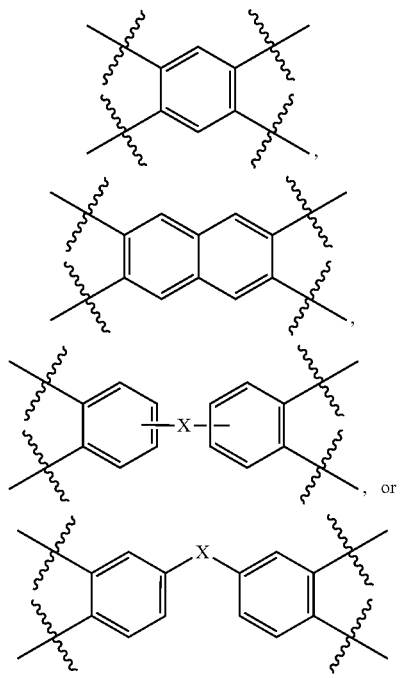

wherein X is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O); specifically $C_1$-$C_3$ alkyl, $CH_2$, $CH_2CH_2$, O, $C(CF_3)_2$, $CH_2OCH_2$, $S(=O)$, $S(=O)_2$, $C(=O)$, $CH_2S(=O)CH_2$, or $CH_2S(=O)_2CH_2$.

The sulfonated poly(amic acid) may be in a salt form, e.g. alkali or alkaline earth metal salt form, or in its neutral sulfonated poly(amic acid) form.

The sulfonated poly(amic acid) can be prepared by the reaction of a dianhydride and a sulfonated diamine using reaction conditions known in the art.

Exemplary dianhydrides include the following structures:

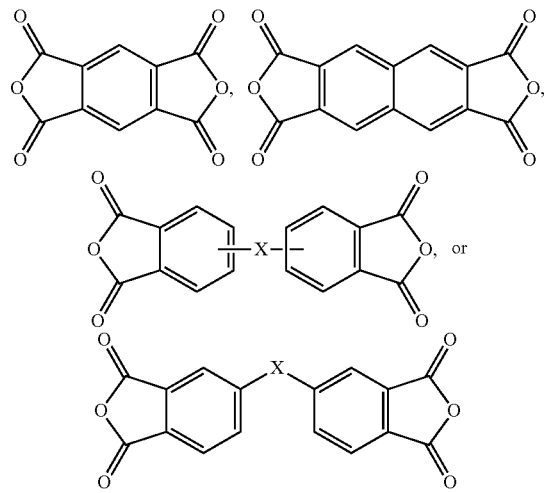

wherein X is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O); specifically $C_1$-$C_3$ alkyl, $CH_2$, $CH_2CH_2$, O, $C(CF_3)_2$, $CH_2OCH_2$, $S(=O)$, $S(=O)_2$, $C(=O)$, $CH_2S(=O)CH_2$, or $CH_2S(=O)_2CH_2$.

Exemplary sulfonated diamines include the following structures

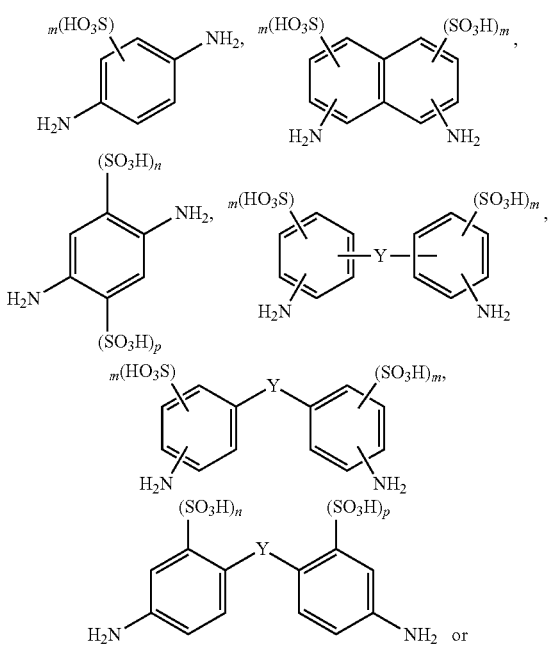

wherein n is 1; m is 0, 1, or 2 with the proviso that the diamine comprises at least one sulfonic acid group; p is 0 or 1; and Y is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O); specifically $C_1$-$C_3$ alkyl, $CH_2$, $CH_2CH_2$, O, $C(CF_3)_2$, $CH_2OCH_2$, $S(=O)$, $S(=O)_2$, $C(=O)$, $CH_2S(=O)CH_2$, or $CH_2S(=O)_2CH_2$.

In a further embodiment, unsulfonated diamines may be polymerized with the sulfonated diamines and dianhydride to tailor the number of sulfonic acid groups in the sulfonated poly(amic acid). Exemplary unsulfonated diamines include the following which may be optionally substituted with one or two alkyl or aryl groups

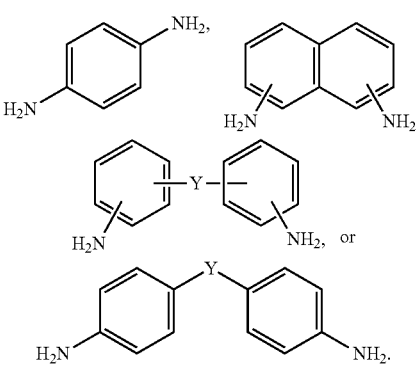

Exemplary processes to prepare the sulfonated poly(amic acid) include reacting the dianhydride, sulfonated diamine, and optional unsulfonated diamine in the presence of an organic amine, in an appropriate solvent, and at a temperature to minimize imidization, to form a sulfonated poly(amic acid) salt, followed by conversion to the neutral sulfonated poly(amic acid). Formation of the neutral species can be achieved using ion exchange processes known in the art.

Suitable organic amines include tertiary amines such as tertiary amines having alkyl, aryl, etc., groups. Exemplary organic amines include triethyl amine, diisopropylethylamine, 1,4-diazabicyclo[2.2.2]octane, and the like. Suitable solvents include those solvents that can dissolve the starting materials and optionally the final product, while at the same time do not react with the reagents. Exemplary solvents include phenol, m-cresol, p-cresol, o-cresol, anisole, halogenated benzene, halogenated phenols (e.g., o-chlorophenol), dimethyl phenol (2,6; 2,5; 2,4; 2,3; 3,4; and 3,5) and the like.

Exemplary temperatures to carry out the polymerization process to form the sulfonated poly(amic acid) include about −20° C. to about 35° C., specifically about −10° C. to about 30° C., yet more specifically about 0° C. to about 25° C., and still yet more specifically about 15° C. to about 20° C.

The polydispersity index of the sulfonated poly(amic acid) can be about 1 to about 3, specifically about 1 to about 2, and more specifically about 1.1 to about 1.5.

The number average molecular weight ($M_n$) of the sulfonated poly(amic acid) can be in the range from about 5,000 to about 50,000, specifically from about 10,000 to about 30,000, and more specifically about 15,000 to about 20,000.

In one embodiment, the sulfonated poly(amic acid) is converted to sulfonated poly(imide) by heating the reaction mass of the sulfonated poly(amic acid) to temperatures well above room temperature, specifically about 100° C. to about 250° C. Complete imidization will occur after heating to 180° C.

In one embodiment, the sulfonated poly(amic acid) is prepared from 4,4'-diaminodiphenyl ether-2,2'-disulfonic acid and 4,4'-oxydiphthalic anhydride.

In another embodiment, the sulfonated poly(amic acid) is prepared from 6FDA (5,5'-[2,2,2-trifluoro-1-(trifluormethyl)ethylidene]bis-1,3-isobenzofurandione; also known as hexafluoroisopropylidene bisphthalic dianhydride; CAS No. 1107-00-2)

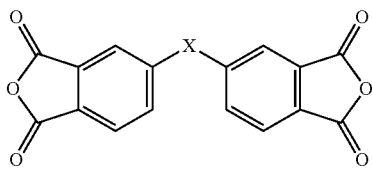

where X is $C(CF_3)_2$ and the diamine is 4,4'-diaminodiphenyl ether-2,2'-disulfonic acid.

The template polymerization to form the conducting polymer-sulfonated poly(amic acid) complex can be achieved by reacting a conducting monomer in the presence of a sulfonated poly(amic acid), and an oxidant in the presence of a suitable solvent. In one embodiment, the reaction is aqueous phase polymerization.

Examples of suitable conducting monomers include those known in the art to exhibit electroactivity when polymerized, including but not limited to thiophene, substituted thiophene, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b]furan, bithiophene, substituted bithiophene, pyrrole, substituted pyrrole, phenylene, substituted phenylene, naphthalene, substituted naphthalene, biphenyl and terphenyl and their substituted versions, phenylene vinylene, substituted phenylene vinylene, aniline, substituted aniline, the monomers disclosed herein as structures (I)-(XXIX), combinations thereof, and the like.

Suitable conducting monomers include 3,4-ethylenedioxythiophene, 3,4-ethylenedithiathiophene, 3,4-ethylenedioxypyrrole, 3,4-ethylenedithiapyrrole, 3,4-ethylenedioxyfuran, 3,4-ethylenedithiafuran, and derivatives having the general structure (I):

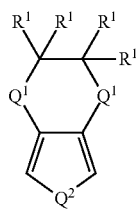

(I)

wherein each occurrence of $Q^1$ is independently S or O; $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $R^1$ is hydrogen. In one embodiment, each $Q^1$ is O and $Q^2$ is S. In another embodiment, each $Q^1$ is O, $Q^2$ is S, and one $R^1$ is $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, —$C_1$-$C_6$ alkyl-O—$C_1$-$C_6$ alkyl, while the remaining $R^1$ are hydrogen. In another embodiment, each $Q^1$ is O, $Q^2$ is S, and one $R^1$ is $C_1$ alkyl-OH, while the remaining $R^1$ are hydrogen. A specific conducting monomer is EDOT.

Another suitable conducting monomer includes an unsubstituted and 2- or 6-substituted thieno[3,4-b]thiophene and thieno[3,4-b]furan having the general structures (II), (III), and (IV):

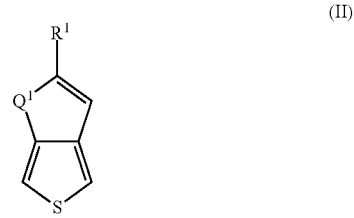

(II)

(III)

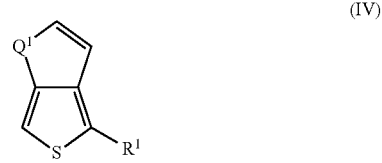

(IV)

wherein $Q^1$ is S, O, or Se; and $R^1$ is hydrogen, $C_1$-$C_{12}$ alkyl, $C_1$-$C_{12}$ haloalkyl including perfluoroalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, $Q^1$ is S and $R^1$ is hydrogen. In another embodiment, $Q^1$ is O and $R^1$ is hydrogen. In yet another embodiment, $Q^1$ is Se and $R^1$ is hydrogen.

Another suitable conducting monomer includes substituted 3,4-propylenedioxythiophene (PropOT) monomers according to the general structure (V):

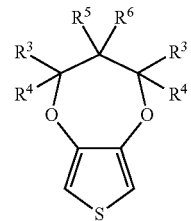

(V)

wherein each instance of $R^3$, $R^4$, $R^5$, and $R^6$ independently is hydrogen; optionally substituted $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, —$C_1$-$C_{10}$ alkyl-aryl; or hydroxyl. The $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, or —$C_1$-$C_{10}$ alkyl-aryl groups each may be optionally substituted with one or more of $C_1$-$C_{20}$ alkyl; aryl; halogen; hydroxyl; —N—$(R^2)_2$ wherein each $R^2$ is independently hydrogen or $C_1$-$C_6$ alkyl; cyano; nitro; —COOH; —S(=O)$C_0$-$C_{10}$ alkyl; or —S(=O)$_2C_0$-$C_{10}$ alkyl. In one embodiment, $R^5$ and $R^6$ are both hydrogen. In another embodiment, $R^5$ and $R^6$ are both hydrogen, each instance of $R^3$ independently is $C_1$-$C_{10}$ alkyl or benzyl, and each instance of $R^4$ independently is hydrogen, $C_1$-$C_{10}$ alkyl, or benzyl. In another embodiment, $R^5$ and $R^6$ are both hydrogen, each instance of $R^3$ independently is $C_1$-$C_5$ alkyl or benzyl and each instance of $R^4$ independently is hydrogen, $C_1$-$C_5$ alkyl, or benzyl. In yet another embodiment, each instance of $R^3$ and $R^4$ are hydrogen, and one of $R^5$ and $R^6$ is hydroxyl while the other is hydrogen.

Other suitable conducting monomers include pyrrole, furan, thiophene, and derivatives having the general structure (VI):

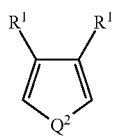

(VI)

wherein $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include isathianaphthene, pyridothiophene, pyrizinothiophene, and derivatives having the general structure (VII):

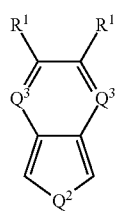

(VII)

wherein $Q^2$ is S, O, or N—$R^2$ wherein $R^2$ is hydrogen or $C_1$-$C_6$ alkyl; each occurrence of $Q^3$ is independently CH or N; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Still other conducting monomers include oxazole, thiazole, and derivatives having the general structure (VIII):

(VIII)

wherein $Q^1$ is S or O.

Additional conducting monomers include the class of compounds according to structure (IX):

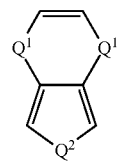

(IX)

wherein $Q^2$ is S, O, or N—$R^2$ wherein $R^2$ is hydrogen or $C_1$-$C_6$ alkyl; and each occurrence of $Q^1$ is independently S or O.

Additional conducting monomers include bithiophene, bifuran, bipyrrole, and derivatives having the following general structure (X):

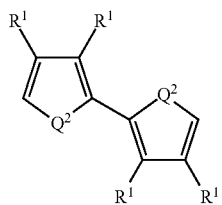

(X)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Conducting monomers include terthiophene, terfuran, terpyrrole, and derivatives having the following general structure (XI):

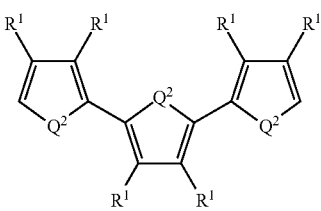

(XI)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include thienothiophene, thienofuran, thienopyrrole, furanylpyrrole, furanylfuran, pyrolylpyrrole, and derivatives having the following general structure (XII):

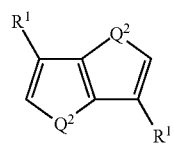

(XII)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Still other conducting monomers include dithienothiophene, difuranylthiophene, dipyrrolylthiophene, dithienofuran, dipyrrolylfuran, dipyrrolylpyrrole, and derivatives having the following general structure (XIII):

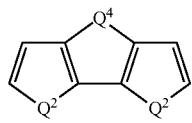

(XIII)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include dithienylcyclopentenone, difuranylcyclopentenone, dipyrrolylcyclopentenone and derivatives having the following general structure (XIV):

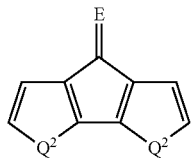

(XIV)

wherein each occurrence of $Q^2$ is independently S, O, or N—$R^2$ wherein $R^2$ is hydrogen or $C_1$-$C_6$ alkyl; and E is O or $C(R^7)_2$, wherein each occurrence of $R^7$ is an electron withdrawing group.

Other suitable conducting monomers include those having the following general structure (XV):

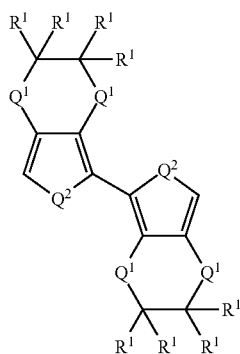

(XV)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $Q^1$ is O; each occurrence of $Q^2$ is S; and each occurrence of $R^1$ is hydrogen.

Additional conducting monomers include dithienovinylene, difuranylvinylene, and dipyrrolylvinylene according to the structure (XVI):

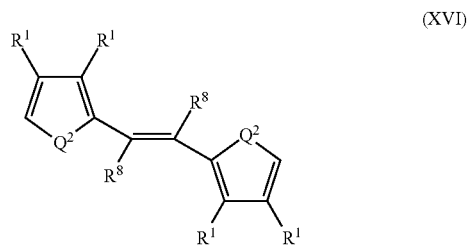

(XVI)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano.

Other conducting monomers include 1,2-Trans(3,4-ethylenedioxythienyl)vinylene, 1,2-trans(3,4-ethylenedioxyfuranyl)vinylene, 1,2-trans(3,4-ethylenedioxypyrrolyl)vinylene, and derivatives according to the structure (XVII):

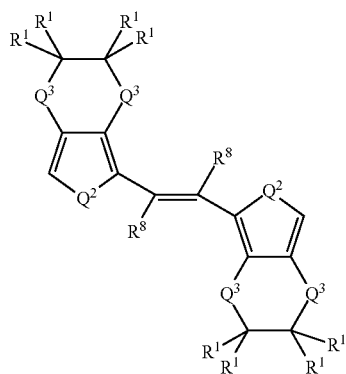

(XVII)

wherein each occurrence of $Q^3$ is independently $CH_2$, S, or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano.

Additional conducting monomers include the class bis-thienylarylenes, bis-furanylarylenes, bis-pyrrolylarylenes and derivatives according to the structure (XVIII):

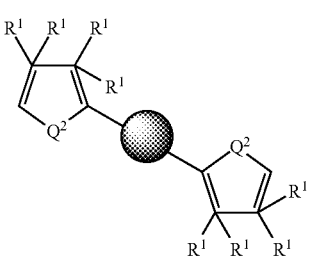

(XVIII)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and ⬤ represents an aryl. Exemplary aryl groups include furan, pyrrole, N-substituted pyrrole, phenyl, biphenyl, thiophene, fluorene, 9-alkyl-9H-carbazole, and the like.

Other conducting monomers include the class of bis(3,4-ethylenedioxythienyl)arylenes, related compounds, and derivatives according to the structure (XIX):

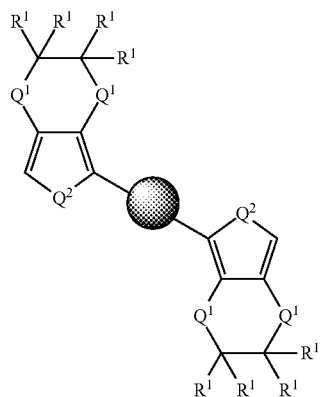

(XIX)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and ⬤ represents an aryl.

Other exemplary conducting monomers include bis(3,4-ethylenedioxythienyl)arylenes according to structure (XIX) includes the compound wherein all $Q^1$ are O, both $Q^2$ are S, all $R^1$ are hydrogen, and ⬤ is phenyl linked at the 1 and 4 positions. Another exemplary compound is where all $Q^1$ are O, both $Q^2$ are S, all $R^1$ are hydrogen, and ⬤ is thiophene linked at the 2 and 5 positions.

Additional conducting monomers include the class of compounds according to structure (XX):

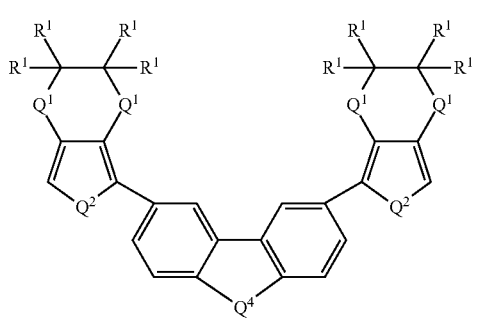

(XX)

wherein each occurrence of $Q^1$ is independently S or O; each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $Q^1$ is O; each occurrence of $Q^2$ is S; each occurrence of $R^1$ is hydrogen; and $R^2$ is methyl.

Still other conducting monomers include the class of compounds according to structure (XXI):

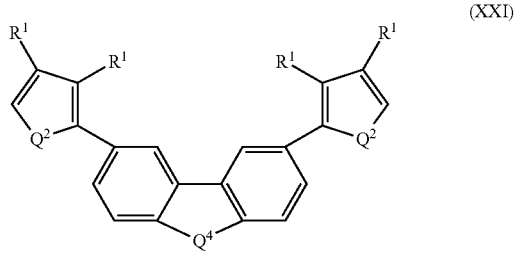

(XXI)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include the class of compounds according to structure (XXII):

(XXII)

wherein each occurrence of $Q^2$ is independently S, O, or N—$R^2$ wherein $R^2$ is hydrogen or $C_1$-$C_6$ alkyl; each occurrence of $Q^4$ is $C(R')_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Other exemplary monomers include the class of compounds according to structure (XXIII):

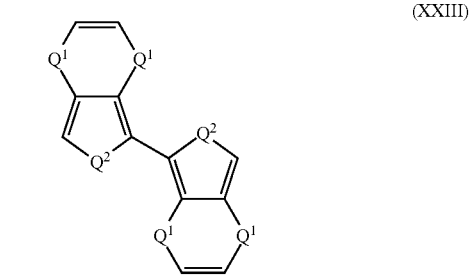

(XXIII)

wherein each occurrence of $Q^2$ is independently S, O, or N—$R^2$ wherein $R^2$ is hydrogen or $C_1$-$C_6$ alkyl; and each occurrence of $Q^1$ is independently S or O.

Exemplary conducting monomers include the class of compounds according to structure (XXIV):

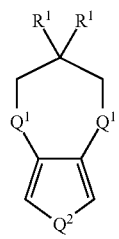

(XXIV)

wherein $Q^2$ is S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-aryl, —$C_1$-$C_6$ alkyl-O-aryl, or —$C_1$-$C_6$ alkyl-O-aryl. In one embodiment, one $R^1$ is methyl and the other $R^1$ is benzyl, —$C_1$-$C_6$ alkyl-O-phenyl, —$C_1$-$C_6$ alkyl-O-biphenyl, or —$C_1$-$C_6$ alkyl-biphenyl.

Additional conducting monomers include the class of compounds according to structure (XXV):

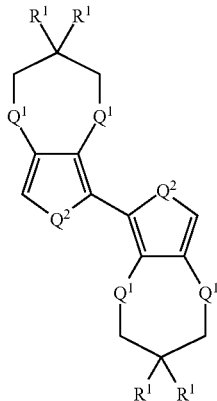

(XXV)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, one $R^1$ is methyl and the other $R^1$ is —$C_1$-$C_6$ alkyl-O-phenyl or —$C_1$-$C_6$ alkyl-O-biphenyl per geminal carbon center.

Other conducting monomers include the class of compounds according to structure (XXVI):

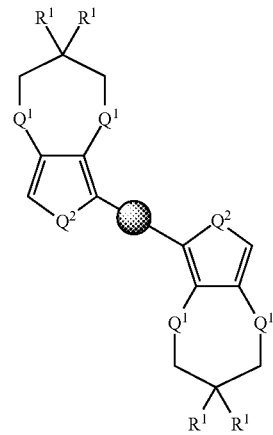

(XXVI)

wherein each occurrence of $Q^2$ is independently S, O, or N—$R^2$ wherein $R^2$ is hydrogen or $C_1$-$C_6$ alkyl; each occurrence of $Q^1$ is independently S or O; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and ● represents an aryl. In one embodiment, one $R^1$ is methyl and the other $R^1$ is —$C_1$-$C_6$ alkyl-O-phenyl or —$C_1$-$C_6$ alkyl-O-biphenyl per geminal carbon center.

Exemplary conducting monomers include the class of compounds according to structure (XXVII):

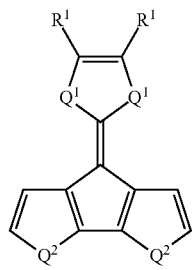

(XXVII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include the class of compounds according to structure (XXVIII):

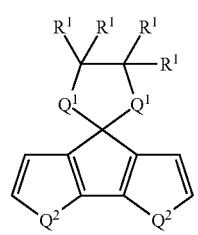

(XXVIII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Another conducting monomer includes aniline or substituted aniline according to structure (XXIX):

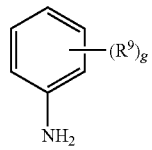

(XXIX)

wherein g is 0, 1, 2, or 3; and each occurrence of $R^9$ is independently $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-O-aryl, or N—$R^2$ wherein $R^2$ is hydrogen or $C_1$-$C_6$ alkyl.

The polydispersity index of the conducting polymer can be about 1 to about 3, specifically about 1 to about 2, and more specifically about 1.1 to about 1.5.

The number average molecular weight ($M_n$) of the conducting polymer can be in the range from about 1,000 to about 40,000, specifically from about 2000 to about 30,000.

The template polymerization may be conducted using a single type of conducting monomer to form a homopolymer, or two or more conducting monomer types in a copolymerization process to form a conducting copolymer. As used herein "conducting polymer" is inclusive of conducting homopolymers and conducting copolymers unless otherwise indicated. Furthermore, in one embodiment, the template polymerization may be conducted with a mixture of conducting monomers and nonconducting monomers.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, "—CHO" is attached through carbon of the carbonyl group.

Unless otherwise indicated, the term "substituted" as used herein means replacement of one or more hydrogens with one or more substituents. Suitable substituents include, for example, hydroxyl, $C_6$-$C_{12}$ aryl, $C_3$-$C_{20}$ cycloalkyl, $C_1$-$C_{20}$ alkyl, halogen, $C_1$-$C_{20}$ alkoxy, $C_1$-$C_{20}$ alkylthio, $C_1$-$C_{20}$ haloalkyl, $C_6$-$C_{12}$ haloaryl, pyridyl, cyano, thiocyanato, nitro, amino, $C_1$-$C_{12}$ alkylamino, $C_1$-$C_{12}$ aminoalkyl, acyl, sulfoxyl, sulfonyl, amido, or carbamoyl.

As used herein, "alkyl" includes straight chain, branched, and cyclic saturated aliphatic hydrocarbon groups, having the specified number of carbon atoms, generally from 1 to about 20 carbon atoms, greater than 3 for the cyclic. Alkyl groups described herein typically have from 1 to about 20, specifically 3 to about 18, and more specifically about 6 to about 12 carbons atoms. Examples of alkyl include, but are not limited to, methyl, ethyl, n-propyl, isopropyl, n-butyl, 3-methylbutyl, t-butyl, n-pentyl, and sec-pentyl. As used herein, "cycloalkyl" indicates a monocyclic or multicyclic saturated or unsaturated hydrocarbon ring group, having the specified number of carbon atoms, usually from 3 to about 10 ring carbon atoms. Monocyclic cycloalkyl groups typically have from 3 to about 8 carbon ring atoms or from 3 to about 7 carbon ring atoms. Multicyclic cycloalkyl groups may have 2 or 3 fused cycloalkyl rings or contain bridged or caged cycloalkyl groups. Examples of cycloalkyl groups include cyclopropyl, cyclobutyl, cyclopentyl, or cyclohexyl as well as bridged or caged saturated ring groups such as norbornane or adamantane.

As used herein "haloalkyl" indicates both branched and straight-chain alkyl groups having the specified number of carbon atoms, substituted with 1 or more halogen atoms, generally up to the maximum allowable number of halogen atoms ("perhalogenated"). Examples of haloalkyl include, but are not limited to, trifluoromethyl, difluoromethyl, 2-fluoroethyl, and penta-fluoroethyl.

As used herein, "alkoxy" includes an alkyl group as defined above with the indicated number of carbon atoms attached through an oxygen bridge (—O—). Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

"Haloalkoxy" indicates a haloalkyl group as defined above attached through an oxygen bridge.

As used herein, the term "aryl" indicates aromatic groups containing only carbon in the aromatic ring or rings. Such aromatic groups may be further substituted with carbon or non-carbon atoms or groups. Typical aryl groups contain 1 or 2 separate, fused, or pendant rings and from 6 to about 12 ring atoms, without heteroatoms as ring members. Where indicated aryl groups may be substituted. Such substitution may include fusion to a 5 to 7-membered saturated cyclic group that optionally contains 1 or 2 heteroatoms independently chosen from N, O, and S, to form, for example, a 3,4-methylenedioxy-phenyl group. Aryl groups include, for example, phenyl, naphthyl, including 1-naphthyl and 2-naphthyl, and bi-phenyl.

As used herein "heteroaryl" indicates aromatic groups containing carbon and one or more heteroatoms chosen from N, O, and S. Exemplary heteroaryls include oxazole, pyridine, pyrazole, thiophene, furan, isoquinoline, and the like. The heteroaryl groups may be substituted with one or more substituents.

As used herein, "halo" or "halogen" refers to fluoro, chloro, bromo, or iodo.

As used herein, "arylene" includes any divalent aromatic hydrocarbon or two or more aromatic hydrocarbons linked by a bond, a heteroatom (e.g., O, S, S(=O), S(=O)$_2$, etc.), a carbonyl group, an optionally substituted carbon chain, a carbon chain interrupted by a heteroatom, and the like.

Suitable solvents for conducting the template polymerization are those that do not adversely affect the reaction, and specifically are inert. Suitable solvents can further be selected on the basis of economics, environmental factors, and the like, and may be organic, aqueous, or a mixture thereof. Suitable organic solvents may be aliphatic alcohols such as methanol and ethanol; aliphatic ketones such as acetone and methyl ethyl ketone; aliphatic carboxylic esters such as ethyl acetate; aromatic hydrocarbons such as toluene and xylene; aliphatic hydrocarbons such as hexane; aliphatic nitriles such as acetonitrile; chlorinated hydrocarbons such as dichloromethane; aliphatic sulfoxides such as dimethyl sulfoxide; and the like, as well as mixtures comprising at least one of the foregoing organic solvents. Specifically an aqueous solvent is used, that is, a liquid comprising water and optionally a water-miscible organic solvent such as a lower alcohol, acetonitrile, tetrahydrofuran, dimethylacetamide, dimethylformamide, and the like.

Reaction temperatures for the template polymerization can be about 0° C. to about 35° C., specifically about 5° C. to about 30° C., yet more specifically about 10° C. to about 25° C., and still yet more specifically about 15° C. to about 20° C. The polymerization is continued for a period of time until the reaction in completed to effect the desired degree of polymerization. The polymerization time may be a few hours up to about ten days, and depends on a number of factors including the size of the reactor utilized, the reaction temperature, the oxidant utilized, and the like. The degree of polymerization can vary depending upon the end use application as is readily determined by one of ordinary skill in the art without undue experimentation.

The amount of sulfonated poly(amic acid) and oxidant to be employed in the aqueous polymerization method may broadly vary and can be determined for any given polymerization without undue experimentation. For example the weight ratio of conducting monomer to sulfonated poly(amic acid) can be about 1:1 to about 1:5, specifically about 1:1.2 to about 1:4, more specifically about 1:1.5 to about 1:3, and yet more specifically about 1:7 to about 1:2. The weight ratio of conducting monomer to chemical oxidant can be about 1:1 to about 1:10, specifically about 1:2 to about 1:9, more specifically about 1:3 to about 1:8, yet more specifically about 1:4 to about 1:7, and still yet more specifically about 1:5 to about 1:6.

Suitable chemical oxidants include iron (III) salts, such as $FeCl_3$, $Fe(ClO_4)_3$ and the iron (III) salts of organic acids and inorganic acids containing organic residues, $H_2O_2$, $K_2Cr_2O_7$, alkali or ammonium persulfates, alkali perborates, potassium permanganate and copper salts such as copper tetrafluoroborate. In addition, iodine, air, and oxygen may advantageously be used as oxidants.

Examples of iron (III) salts of organic acids are the Fe(III) salts of $C_1$-$C_{30}$ alkyl sulfonic acids, such as methane or dodecane sulfonic acid; aliphatic $C_1$-$C_{20}$ carboxylic acids, such as 2-ethylhexylcarboxylic acid, aliphatic perfluorocarboxylic acids, such as trifluoroacetic acid and perfluorooctanoic acid; aliphatic dicarboxylic acids, such as oxalic acid, and, aromatic, optionally $C_1$-$C_{20}$-alkyl-substituted sulfonic acids, such as benzenesulfonic acid, p-toluene-sulfonic acid, and dodecyl benzenesulfonic acid and mixtures of the aforementioned Fe(III) salts of organic acids. Examples of iron (III) salts of inorganic acids containing organic residues are the iron (III) salts of sulfuric acid semiesters of $C_1$-$C_{20}$ alkanols, for example the Fe(III) salt of lauryl sulfate.

The result of the template polymerization is the formation of conducting polymer-sulfonated poly(amic acid) dispersions in an organic or aqueous liquid carrier. It is to be understood that the term "dispersion" as used herein is inclusive of compositions wherein none or a portion of the polymer is fully dissolved in the liquid. Specifically, the polymers of the dispersion are in the form of small particles that are storage stable, i.e., remain in substantially the same particulate form for at least about 24 hours, more specifically at least about 48 hours, even more specifically at least about one week, and yet more specifically at least about one month. In one embodiment, the liquid carrier is the same as the solvent in which the polymers are manufactured, preferably water or one or more water-miscible organic solvents. Of course, an additional solvent may be used to dilute the dispersion if desired. The amount of the polymer complex in the dispersion may vary from about 1 to about 99 percent by weight depending upon a variety of factors, for example, the nature of the solvent, the nature of the polymer, the molecular weight of the polymer, and the end-use application, and is readily determined by one of ordinary skill in the art without undue experimentation.

In one embodiment, the dispersion comprises a conducting polymer-sulfonated poly(amic acid) or -poly(imide) complex having a particle size of about 10 to about 100 nm, more specifically about 15 to about 75 nm, yet more specifically about 20 to about 60 nm, and still yet more specifically about 25 to about 50 nm. Particle size can be determined using known techniques in the art including light scattering analysis or Transmission Electron Microscopy.

Dispersions or solutions containing the conducting polymer-poly(amic acid) or -poly(imide) can be formed into films by applying the dispersions or solutions to a substrate via conventional processes including ink jet printing, screen printing, roll to roll printing processes, reel to reel processing, spin coating, meniscus and dip coating, spray coating, brush coating, doctor blade application, curtain casting, drop casting, and the like, to form a layer. Suitable substrates are solid materials (flexible or rigid) suitable for deposition of the polymeric compositions, and may be, for example, glass, an organic polymer such as a plastic, silicon, a mineral, a semiconducting material, a ceramic, a metal, and the like, as well as a combination comprising at least one of the foregoing materials. The substrate may be inherently conductive.

The liquid may be removed from the layer of the dispersion or solution by conventional techniques to form a film. Removal of the liquid may be effected at room temperature or other temperature that does not adversely affect the properties of the resulting film. However, to obtain higher processing speeds, the film can be dried at elevated temperatures to both remove any liquid, but also to induce imidization and removal of the resulting water.

Films and layers of the conducting polymer-sulfonated poly(amic acid) complex can be annealed at high temperatures with a corresponding change in polymer morphology. The sulfonated poly(amic acid) template undergoes a chemical transformation in the annealing process converting the sulfonated poly(amic acid) to a sulfonated poly(imide). This chemical conversion of the template polymer results in a surprising enhancement in electrical conductivity (10-fold for PEDOT-poly(amic acid) to PEDOT-poly(imide)) due to a change in polymer backbone rigidity. The resulting sulfonated poly(imide) also has high thermal stability.

The annealing temperatures include temperatures above 150° C. and in excess of 300° C., specifically about 150° C. to about 350° C., more specifically about 180° C. to about 325° C., yet more specifically about 200° C. to about 300° C., and still yet more specifically about 225° C. to about 275° C.

In one embodiment, an annealing process is used to convert the sulfonated poly(amic acid) to sulfonated poly(imide) to result in the conducting polymer-sulfonated poly(imide) complex that has enhanced conductivity over the conducting polymer-sulfonated poly(amic acid) complex.

In one embodiment, the conducting monomer EDOT or aniline is converted to a conducting polymer by template polymerization using a sulfonated poly(amic acid) prepared from 4,4'-diaminodiphenyl ether-2,2'-disulfonic acid and 4,4'-oxydiphthalic anhydride to form PEDOT-O-DPDA SPAA or poly(aniline)-O-DPDA SPAA. The resulting PEDOT-O-DPDA SPAA or poly(aniline)-O-DPDA SPAA can then be converted to PEDOT-O-DPDA SPI or poly (aniline)-O-DPDA SPI as described herein.

In another embodiment, the conducting monomer EDOT or aniline is converted to a conducting polymer by template polymerization using a sulfonated poly(amic acid) prepared from 6FDA (5,5'-[2,2,2-trifluoro-1-(trifluorormethyl)ethylidene]bis-1,3-isobenzofurandione) and the diamine is 4,4'-diaminodiphenyl ether-2,2'-disulfonic acid to form either PEDOT-6FDA SPAA or poly(aniline)-6FDA SPAA. The resulting PEDOT-6FDA SPAA or poly(aniline)-6FDA SPAA can be converted to PEDOT-6FDA SPI or poly(aniline)-6FDA SPI as described herein.

In one embodiment, a solvent soluble, specifically water soluble, sulfonated poly(imide) can be used for the template polymerization rather than the corresponding sulfonated poly(amic acid). Within this embodiment, the template polymerization to form the conducting polymer-sulfonated poly(imide) complex can be achieved by reacting a conducting monomer in the presence of a solvent soluble (e.g., water soluble) sulfonated poly(imide), and an oxidant in the presence of a suitable solvent.

The electrical conductivity of the films can be readily modified, if necessary, to meet the requirements of a desired application by doping with conventional acidic dopants (p-dopants) or basic dopants (n-dopants) known in the art. Suitable p-dopants include mineral acids such as HCl, $HNO_3$, $H_2SO_4$, $H_3PO_4$, HBr, and HI; organic sulfonic acids such as dodecyl benzene sulfonic acid, lauryl sulfonic acid, camphor sulfonic acid, organic acid dyes, methane sulfonic acid, and toluene sulfonic acid; carboxylic acids such as adipic acid, azelaic acid, and oxalic acid; and polycarboxylic acids such as poly(acrylic acid), poly(maleic acid), poly(methacrylic acid), and copolymers formed from acrylic acid, maleic acid, or methacrylic acid. Conventional mixed dopants comprising one or more of the foregoing, such as a mixture of a mineral acid and an organic acid, can also be used to impart the desired electroactive character to the films. Suitable basic dopants include, but are not limited to Na, K, Li, and Ca. Other suitable dopants include $I_2$, $PF_6$, $SbF_6$, and $FeCl_3$. In some instances the oxidant and the dopant may be the same.

In one embodiment, the dopant/additive is added to the solution during synthesis.

Admixtures of the polymer with other electroactive materials such as laser dyes, other electroactive polymers, hole transport or electron transport materials, including electroactive organometallic compounds, are also contemplated herein. Such materials can be added to the polymer before or after formation of the solution or dispersion. Additives such as ethylene glycol, diethylene glycol, mannitol, propylene 1,3-glycol, butane 1,4-glycol, N-methylpyrrolidone (NMP), sorbitol, glycerol, propylene carbonate, isopropanol, dimethyl sulfoxide (DMSO), N,N-dimethyl formamide (DMF), tetrahydrofuran (THF), mixtures thereof, and other appropriate high boiling organics may be added to dispersions of the polymeric compositions to improve conductivity.

Exemplary small-molecule additives/dopants that can withstand the conditions of high temperature applications and processing include quinoxaline; hydroquinone; phenol; 2,3-dihydrobenzo[b][1,4]dioxine (aka benzo-1,4-dioxan); 1,2,4,5-tetraalkoxybenzene (e.g., 1,2,4,5-tetramethoxybenzene); pyridine; quinoline; imidazole; benzimidazole; 2-(pyridine-2-yl)pyridine; 2-(arylamino)benzoic acid (e.g., 2-(phenylamino)benzoic acid; DMF; 1-methylpyrrolidin-2-one ("NMP"); N,N-dimethylacetamide ("DMAC"); benzobisimidazole

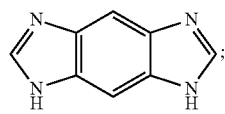 [SMILES: c1nc2cc3nc[nH]c3cc2[nH]1]

ionic liquids such as 1-butyl-3-methylimidazolium hexafluorophosphate ($BMIMPF_6$); N,N'-dimethyl-4,4'-bipyridinium dihalide;

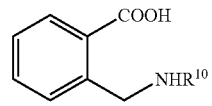

where $R^{10}$ is H, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and the like; and combinations thereof.

The small-molecule additive/dopant can be present in amounts of about 0.01 to about 10 weight percent (wt. %), specifically about 0.05 to about 5 wt. %, more specifically about 0.075 to about 3 wt. %, and yet more specifically about 0.1 to about 1 wt. % of additive to total weight of composition (solid wt. based).

At present, the PEDOT-PSS of the known art is, after additive formulations, ⅓ the conductivity of that of indium doped tin oxide (ITO). In contrast, the conducting polymer-sulfonated poly(imide) complex and annealing methods of conducting polymer-sulfonated poly(amic acid) complex described herein result in ten-fold enhancement in conductivity upon imidization during the annealing process. The conducting polymer-sulfonated poly(imide) complex with appropriate additive formulation chemistry exhibit conductivity higher than that of ITO.

Additional additives may also be used, and include conductive fillers such as particulate copper, silver, nickel, aluminum, carbon black (carbon nanotubes, buckminister fullerene), and the like; non-conductive fillers such as talc, mica, wollastonite, silica, clay, dyes, pigments (zeolites), and the like, to promote specific properties such as increased modulus, surface hardness, surface color and the like; antioxidants; UV stabilizers; viscosity modifiers; and surfactants such as acetylenic diols, surfactants typically being added to control stability, surface tension, and surface wettability.

The conducting polymer-poly(amic acid) or -poly(imide) complexes disclosed herein can be processed by conventional methods to provide uniform, thin films that possess utility in numerous applications. Films and materials comprising the above-described complexes can be utilized in a variety of applications, including optically transparent conductive materials, antistatic coatings, electrically conductive coatings, electrochromics, photovoltaic devices, light emitting diodes for display applications, hole injection layers for light emitting diodes, ion storage layers, near infrared light emitting diodes, transparent conductive coating for indium doped tin oxide replacement, flat panel displays, flexible displays, photoimageable circuits, printable circuits, thin film transistor devices, batteries, electrical switches, capacitor coatings, corrosion resistant coatings, electromagnetic shielding, sensors, biosensors, dimmable mirrors, type III supercapacitors, LED lighting, and the like, and specifically electrochromic windows, electrochromic films for reflective devices, and electrochromic displays. The electrical conductivity of the polymers can be readily modified, if necessary, to meet the requirements of any of the previously mentioned applications by doping the polymers with conventional dopants such as anions (for p-doped polymers) and cation dopants (for n-doped polymers) known in the art.

Although many devices that would use PEDOT-PSS would not be operating at temperatures nearing the degradation limits of the polymer, it is noted many processing steps would exceed such temperatures. Annealing with secondary dopants or additives may reach above 200° C., or for prolonged periods at 180° C., resulting in a loss of conductivity rather than the desired improvement. The disclosed conducting polymer-sulfonated poly(mide) complexes exhibit heat stability which allows the use of these materials in melt processing procedures. Melt-processing, such as melt-processing of polycarbonate for device encasement, particularly at temperatures above 200° C. would not be possible with PEDOT-PSS, but is feasible with a PEDOT-pol(amic acid) or PEDOT-poly(imide) described herein.

The following illustrative examples are provided to further describe how to make and use the polymers and are not intended to limit the scope of the claimed invention.

EXAMPLES

As electrochemically prepared PEDOT is stable up to 300° C., based on TGA measurements, a poly(amic acid) template was explored to provide higher thermal stability of the conducting polymer than the existing polystyrene sulfonic acid.

Synthesis of 4,4'-Diaminodiphenyl Ether-2,2'-disulfonic Acid (4,4'-ODADS)

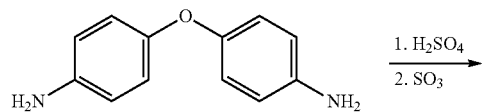

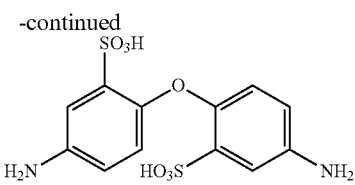

To a 100 mL three-neck flask with a stirring device was added 2.00 g (10.0 mmol) of 4,4'-diaminodiphenyl ether (4,4'-ODA). The flask was cooled in an ice bath, and then 1.7 mL of concentrated (95%) sulfuric acid was slowly added with stirring. After 4,4'-ODA was completely dissolved, 10.5 mL of fuming ($SO_3$ 20%) sulfuric acid was slowly added to the flask. The reaction mixture was stirred at 0° C. for 2 h and then slowly heated to 80° C. and kept at this temperature for an additional 3 h. After cooling to room temperature, the slurry solution mixture was carefully poured onto 20 g of crushed ice. The resulting white precipitate was filtered off and then redissolved in a sodium hydroxide solution. The basic solution was filtered, and the filtrate was acidified with concentrated hydrochloric acid. The solid was filtered off, washed with water and methanol successively, and dried at 80° C. in vacuum oven overnight to afford 4,4'-Diaminodiphenyl Ether-2,2'-disulfonic Acid (4,4'-ODADS). The monomer structure was confirmed by proton nuclear magnetic resonance ($^1$H NMR) and Fourier Transform Infrared spectroscopy (FTIR). The sulfonation primarily occurred at the meta position.

Synthesis of sulfonated poly(amic acid) (O-DPDA SPAA)

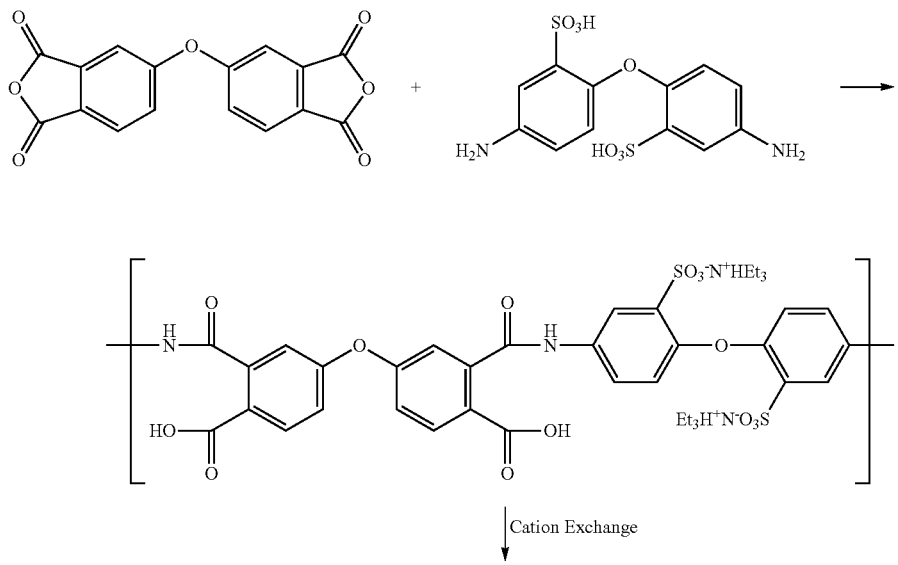

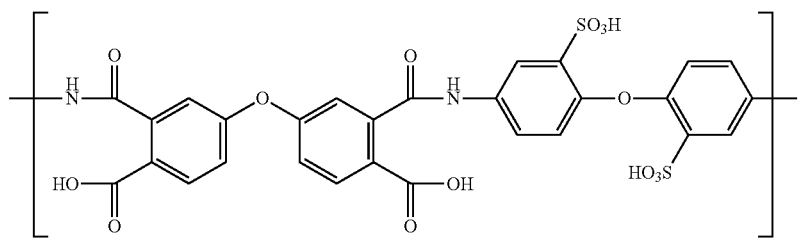

To a 100 mL three-neck flask with $N_2$ inlet and outlet was added 0.5467 g (1.5171 mmol) of 4,4'-ODADS, 6 mL of m-cresol, and 0.3617 g (3.5745 mmol) of triethylamine. After 4,4'-ODADS was completely dissolved, 0.4706 g (1.5171 mmol) of 4,4'-oxydiphthalic anhydride (O-DPDA) was added and then stirred at room temperature (to prevent imidization) for 24 h. When the reaction was complete, the reaction mixture was decanted into acetone (75 mL), filtered, washed with acetone (25 mL, 2 times), and dried at 50° C. in a vacuum oven overnight (0.8511 g, 83.66% yield). The sulfonated poly(amic acid) was purified via dialysis tube (Molecular weight cut off [MWCO]=3.5 to 5 kD; purchased from Spectrum Laboratories Inc.). O-DPDA SPAA dissolved in water was loaded inside the dialysis tube and soaked in DI water for 24 h, changing the water twice (2 times at 12 h each).

The purified O-DPDA SPAA salt form was changed to O-DPDA SPAA acid form with an ion exchange resin of strong acid type DOWEX 50WX8 (cation exchange, 50-100 mesh). The O-DPDA SPAA salt form was stirred in DI water with the ion exchange resin ($H^+$) for 1 h to convert it to the free acid form ($SO_3H$); it was centrifuged and filtered in a crucible filter (pH ca. 1), and then dried at 50° C. in vacuum oven overnight. The structure of O-DPDA poly(amic acid) in acid form was confirmed with FTIR. The broad absorption band at 3476.9 $cm^{-1}$ is assigned to the absorbed water in the sample (the sulfonic acid groups are highly hydrophilic). The strong absorption bands around 1719.7 $cm^{-1}$ are assigned to the symmetric imide C=O stretching, however this peak did not indicate complete imidization. Complete imidization will occur after heating at 180° C., wherein two molecules of water will be liberated from the poly(amic acid) backbone and result in cyclization to the poly(imide). The peak at 1663.3 $cm^{-1}$ indicate the absorption bands of carbonyl group (CONH) and peak at approximately 2500-3500 $cm^{-1}$ indicate the absorption bands of the carboxylic acid (COOH). The sulfonic acid groups ($SO_3H$) appear at 1029.0 $cm^{-1}$, which confirmed formation of the prepared poly(amic acid). Elemental analysis of sulfonated poly(amic acid) (SPAA) was (Theoretical/Found); % C (50.152/49.411), % H (2.705/4.190), % N (4.177/4.763), % S (9.564/7.871). Molecular weight and molecular weight distributions of O-DPDA SPAA were $M_n$=20,769, $M_w$=35,502, PDI=1.71.

In an alternate procedure, the O-DPDA SPAA salt form was purified with Amberlite* IR-120 ($Na^+$ form) ion exchange resin. The O-DPDA SPAA salt form was stirred in DI water with the ion exchange resin for 1 h to convert to the sulfonated poly(amic acid) sodium form ($Na^+$); centrifuged and filtered in a crucible filter and then dried at 50° C. in vacuum oven overnight.

Synthesis of sulfonated poly(amic acid) (6FDA SPAA)

To a 100 mL three-neck flask with $N_2$ inlet and outlet was added 0.5432 g (1.5074 mmol) of 4,4'-ODADS, 8 mL of m-cresol, and 0.3661 g (3.6177 mmol) of triethylamine. After 4,4'-ODADS was completely dissolved, 0.6696 g (1.5074 mmol) of 5,5'-[2,2,2-trifluoro-1-(trifluorormethyl)ethylidene]bis-1,3-isobenzofurandione (6FDA) was added and then stirred at room temperature for 24 h. When the reaction was complete, the reaction mixture was decanted into acetone (75 mL), filtered, washed with acetone (25 mL, 2 times), and dried at 50° C. in a vacuum oven overnight (1.0346 g, 85.31% yield). The 6FDA sulfonated poly(amic acid) was purified via dialysis tube. The 6FDA SPAA dissolved in water was loaded inside the dialysis tube and soaked in DI water for 24 h, changing the water twice (2 times at 12 h each). The resulting purified 6FDA SPAA was changed to 6FDA SPAA acid form using an ion exchange resin of strong acid type DOWEX 50WX8 (cation exchange) as described above. Alternatively, the 6FDA SPAA was purified with Amberlite* IR-120 ($Na^+$ form) ion exchange resin to form the sulfonated poly(amic acid) sodium form ($Na^+$), using a procedure as described above. Molecular weight and molecular weight distributions of 6FDA SPAA were $M_n$=18,627, $M_w$=39,442, and PDI=2.12.

The templates O-DPDA SPAA and 6FDA SPAA were chosen to explore the effect of the differences in rigidity for the preparation and properties of conducting polymer complexes. Not wishing to be bound by theory, it is proposed that if the template is too rigid, either it will not be soluble in water when sulfonated or it will not allow for the templating of a conducting polymer. The system 6FDA SPAA is more rigid than O-DPDA SPAA, but it was not so rigid as to disallow formation of the templated conducting polymer, as shown below.

Example 1a

Template Polymerization of EDOT and O-DPDA sulfonated poly(amic acid) (PEDOT-O-DPDA SPAA)

To a 25 mL one neck flask, 21.30 mg (0.15 mmol) of EDOT (distilled before use) and 0.200 g of O-DPDA SPAA (acid form) were added. To this suspension 103.2 mg of iron (III) p-toluene sulfonate hexahydrate was added. The total mass of all the reactants was adjusted to 10 g by adding appropriate amount of de-ionized water. The reaction mixture was stirred vigorously for 7 days at room temperature leading to a dark blue dispersion, and purified according to literature procedure (Lee B, Seshadri V, Sotzing G A. Langmuir 2005; 21:10797-10802; and Lee B, Seshadri V, Sotzing G A. Synth Met 2005; 152:177-180). In another procedure 108.4 mg (0.16 mmol) of iron (III) p-toluene sulfonate hexahydrate was used.

Example 1b

Template Polymerization of EDOT and 6FDA sulfonated poly(amic acid) (PEDOT-6FDA SPAA)

To a 25 mL one neck flask, 18.46 mg (0.13 mmol) of EDOT and 0.200 g (0.25 mmol) of 6FDA SPAA (acid form) were added. To this suspension 86.0 mg of iron (III) p-toluene sulfonate hexahydrate was added. The total mass of all the reactants was adjusted to 10 g by adding appropriate amount of de-ionized water. The reaction mixture was stirred vigorously for 5 days at room temperature leading to a dark blue dispersion of PEDOT-6FDA SPAA, which was purified according to the procedure of Example 1a. In another procedure 108.4 mg (0.16 mmol) of iron (III) p-toluene sulfonate hexahydrate was used.

Example 1c

Template Polymerization of aniline (ANi) and O-DPDA sulfonated poly(amic acid) (PANi-O-DPDA SPAA)

To a 100 mL one neck flask, 48.3 μL (0.53 mmol) of aniline (ANi) was introduced dropwise in 0.5 M aqueous HCl solution 40 mL and was stirred for 1 h. Then, 47.34 mg of O-DPDA sulfonated poly(amic acid) $Na^+$ form (obtained from Amberlite* IR-120 ion exchange process) was added to the mixed solution and stirred for 1 h. The polymerization of ANi was conducted using ammonium peroxydisulfate (APS) 157.46 mg (0.69 mmol). The reaction mixture was stirred vigorously for 12 h at room temperature leading to a dark green dispersion pf PANi-O-DPDA SPAA.

Example 1d

Template Polymerization of ANi and 6FDA sulfonated poly(amic acid) (PANi-6FDA SPAA)

The procedure according to Example 1c was followed using 54.32 mg of 6FDA SPAA Na$^+$ form, obtained by ion exchange using Amberlite* IR-120, to result in PANi-6FDA SPAA.

Example 1e

Template Polymerization of Py and O-DPDA sulfonated poly(amic acid) (PPy-O-DPDA SPAA)

To a 25 mL one neck flask, 10.06 mg (0.15 mmol) of pyrrole (Py) and 200.0 mg (0.30 mmol) of O-DPDA SPAA were added. To this suspension 108.40 mg (0.16 mmol) of iron (III) p-toluene sulfonate hexahydrate was added. The total mass of the reactants was adjusted to 10 g by adding appropriate amount of de-ionized water. The reaction mixtures were stirred vigorously for 5 days at room temperature leading to a black dispersion.

Example 1f

Template Polymerization of Py and 6FDA sulfonated poly(amic acid) (PPy-6FDA SPAA)

To a 25 mL one neck flask, 10.06 mg (0.15 mmol) of pyrrole (Py) and 230.6 mg (0.30 mmol) of 6FDA SPAA were added. To this suspension 108.40 mg (0.16 mmol) of iron (III) p-toluene sulfonate hexahydrate was added. The total mass of the reactants was adjusted to 10 g by adding appropriate amount of de-ionized water. The reaction mixtures were stirred vigorously for 5 days at room temperature leading to a black dispersion.

Comparative Example 1a

Template Polymerization of EDOT and poly(styrenesulfonic acid) (PEDOT-PSS)

To a 25 mL one neck flask, 51.12 mg (0.36 mmol) of EDOT and 0.697 g of 18 wt. % PSSA aqueous solution were added. To this suspension 257.53 mg of iron (III) p-toluene sulfonate hexahydrate was added. The total mass of all the reactants was adjusted to 10 g by adding an appropriate amount of de-ionized water. The reaction mixture was stirred vigorously for 24 h at room temperature leading to a dark blue dispersion, and purified according to the purification procedure outlined in Example 1a.

Comparative Example 1b

Template Polymerization of EDOT and poly(styrenesulfonic acid) (PEDOT-PSS)

To a 25 mL one neck flask, 21.3 mg (0.15 mmol) of EDOT and 290.4 mg of 18 wt. % PSSA aqueous solution were added. To this suspension 108.4 mg (0.16 mmol) of iron (III) p-toluene sulfonate hexahydrate was added. The total mass of all the reactants was adjusted to 10 g by adding an appropriate amount of de-ionized water. The reaction mixture was stirred vigorously for 24 h at room temperature leading to a dark blue dispersion, purified according to literature procedure (EP339340 B1).

Comparative Example 1c

Template Polymerization of ANi and poly(styrenesulfonic acid) (PANi-PSS)

To a 100 mL one neck flask, 49.36 mg (0.53 mmol) of ANi was introduced dropwise in 0.5 M aqueous HCl solution 40 mL and was stirred for 1 h. Then, 600.0 mg (0.07 mmol) of PSS-Na$^+$ was added to the mixed solution and was stirred for 1 h. The polymerization of ANi was conducted with 157.46 mg (0.69 mmol) of APS as an oxidizing agent. The reaction mixtures were stirred vigorously for 12 h at room temperature leading to a dark green dispersion.

Comparative Example 1d

Template Polymerization of Py and poly(styrenesulfonic acid) (PPy-PSS)

To a 25 mL one neck flask, 10.06 mg (0.15 mmol) of Py and 290.4 mg of 18 wt. % PSSA aqueous solution were added. To this suspension 108.40 mg (0.16 mmol) of iron (III) p-toluene sulfonate hexahydrate was added. The total mass of all the reactants was adjusted to 10 g by adding an appropriate amount of de-ionized water. The reaction mixture was stirred vigorously for 24 h at room temperature leading to a black dispersion.

Example 2a

Preparation of PEDOT-O-DPDA SPAA Films

Films were prepared by spin coating, for 60 seconds at 3000 rpm, PEDOT-O-DPDA SPAA and doped PEDOT-O-DPDA SPAA onto glass slides at room temperature. The films were annealed at 180° C. for 10 or 90 min, and 300° C. for 10 min for improving conductivities with thermal treatment. Separate films of each material were evaluated for conductivity at room temperature after annealing. PEDOT-SPAA films were also prepared with 5 wt. % of d-sorbitol (97% purchased from Acros Organics), 0.1 wt. % dimethylformamide (DMF), 0.1 wt. % Surfynol® 2502 (an ethoxylated/propoxylated acetylenic-based surfactant, CAS No. 182211-02-5, purchased from Air Products, Inc.), and with all three components.

Examples 2b., 2c., and 2d

Preparation of PEDOT-6FDA SPAA, PANi-O-DPDA SPAA, and PANi-6FDA SPAA films

PEDOT-6FDA SPAA, PANi-O-DPDA SPAA, and PANi-6FDA SPAA films were prepared according to the procedure of Example 2a.

Examples 2e-2j

Preparation of drop cast films of PEDOT, PANi, and Ppy complexes with O-DPDA SPAA and 6FDA SPAA Films were prepared by drop casting pristine films and doped films onto glass slides at room temperature. The films were annealed at 180° C. for 10 or 90 min, and 300° C. for 10 min for improving conductivities with thermal treatment. Separate films of each material were evaluated for conductivity at room temperature after annealing. All films were also prepared with 5 wt. % of d-sorbitol, 0.1 wt. % DMF, 0.1 wt. % Surfynol® 2502, and with all three components simultaneously. The drop cast films include 2e PEDOT-O-DPDA SPAA, 2f PEDOT-6FDA SPAA, 2 g PANi-O-DPDA SPAA, 2 h PANi-6FDA SPAA, 21 PPy-O-DPDA SPAA, and 2j PPy-6FDA SPAA.

Comparative Example 2a

Preparation of PEDOT-PSS films, spin coating

Films were prepared by spin coating, for 60 seconds at 3000 rpm, PEDOT-PSS, onto glass slides at room temperature. The films were annealed at 180° C. for 10 or 90 min., and 300° C. for 10 min. and evaluated for conductivity at room temperature after annealing as in Example 2.

Comparative Example 2b

Preparation of PEDOT-PSS Films, Drop Casting

Films were prepared as described in Examples 2e.-2j. above.
Measurements
FTIR was performed using a MAGNA-IR560. Spectra was taken on ground powder in a KBr matrix with a scanning range of 500-4000 $cm^{-1}$, 64 scans at a resolution of 4 $cm^{-1}$. Thermogravimetric Analysis (TGA) was performed by a Perkin-Elmer TGA 7 series analysis system at a heating rate of 20° C./min under air at a flow rate of 60 mL/min. Gel Permeation Chromatography (GPC) was done using a millipore model 150-C GPC system; DMAC was used as the mobile phase. The results were calibrated by standards of poly(m-ethyl methacrylate). $^1$H NMR spectra were recorded on a Bruker DMX-500 NMR Spectrometer. Elemental analysis was performed using a Vario Micro Elementar CHNS system. The PEDOT-PSS and PEDOT-SPAA particles were imaged using JEOL 2010 Fas and Philips EM420 transmission electron microscope. Conductivities were measured using a four-line collinear array utilizing a Keithley Instruments 224 constant current source and a 2700 Multimeter. The polymer was coated on the glass substrate having four gold coated leads on the surface across the entire width of the polymer and 0.25 cm apart from each other. The current was applied across the outer leads and voltage was measured across the inner leads.
Conductivity, Spin Cast Films Conductivity for PEDOT-PSS (Comparative Example 2a), PEDOT-O-DPDA SPAA (Example 2a), PEDOT-6FDA SPAA (Example 2b), PANi-O-DPDA SPAA (Example 2c), and PANi-6FDA SPAA (Example 2d) films was measured via the four-point probe technique. An increase in conductivity by heat treatment at 180° C. for 10 minutes of the PEDOT-SPAA and PANi-SPAA was observed, resulting in PEDOT-SPI and PANi-SPI, respectively. Without the addition of dopants, conductivities for the PEDOT-O-DPDA SPI were found to be 10-fold greater, while those of PEDOT-PSS showed no change. This increase is attributed to the imidization reaction which occurs at this temperature. This imidization was confirmed by FTIR measurements. The conversion of the O-DPDA SPAA template to O-DPDA SPI observed by FTIR corresponds to the conversion of PEDOT-O-DPDA SPAA to PEDOT-O-DPDA SPI observed by FTIR. In both cases, the peaks at 1778.6 $cm^{-1}$ and 1718.6 $cm^{-1}$ correspond to the imide form and the amide form, respectively. This confirmed that imidization takes place during the relatively short curing process. After heat treatment, the chain alignment in thin polymer films often changes with temperature, leading to modified morphologies. The peak at 1191.7 $cm^{-1}$ in the conversion of PEDOT-O-DPDA SPAA to PEDOT-O-DPDA SPI indicated stretching in the ethylenedioxy group in structure which is differential peak from SPI and SPAA. The other peaks at 1515, 1473, 1388, 1311 $cm^{-1}$ indicate the C=C and C—C bonds in thiophene.

The scheme below illustrates the conversion of PEDOT-O-DPDA SPAA to thermally stable PEDOT-O-DPDA SPI.

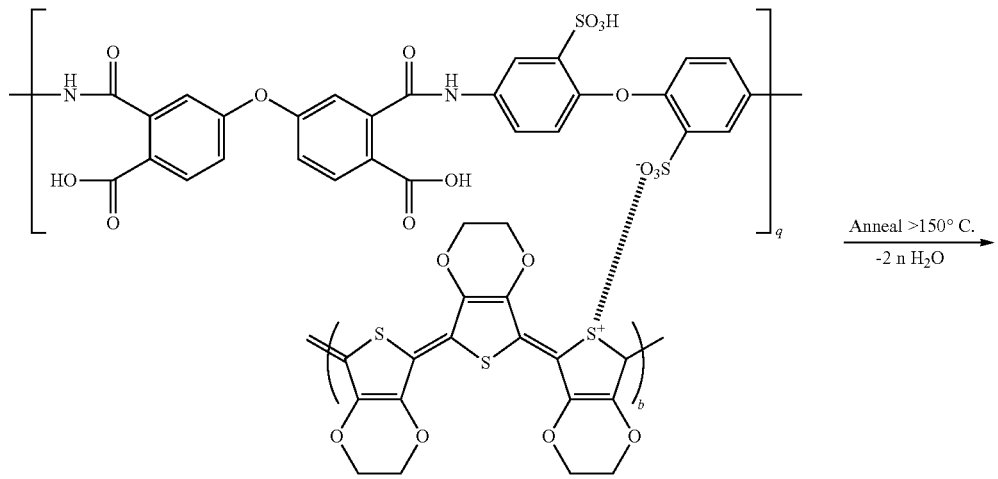

-continued

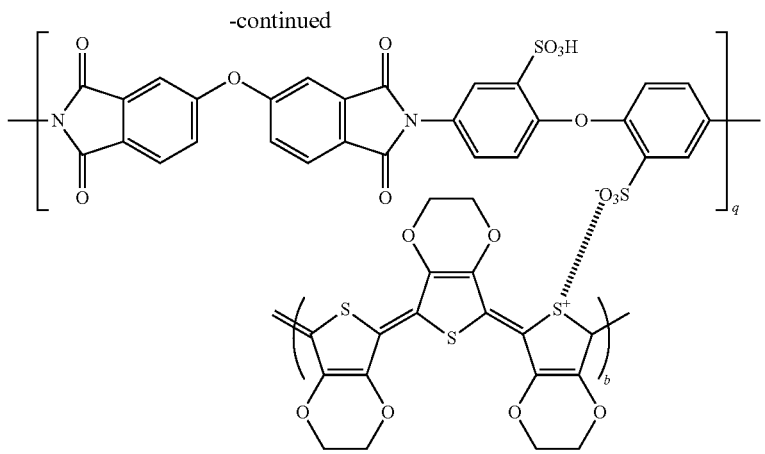

Films were also prepared and annealed for 90 minutes at 180° C. It is known that films of PEDOT-PSS can be heated in air at 100° C. for up to 1000 h with no change in conductivity. However, at this temperature for this time, PEDOT-PSS was reduced to 84% of its conductivity, while PEDOT-O-DPDA SPI films exhibited a 3-fold improvement over the PEDOT-O-DPDA SPAA. Annealing at 300° C. for 10 minutes resulted in PEDOT-PSS samples that could no longer be measured ($<1\times10^{-5}$ S/cm) whereas PEDOT-O-DPDA SPI films showed a 6-fold increase in conductivity. These conductivities and those of PEDOT-6FDA SPAA are summarized in Table 1.

TABLE 1

Conductivities of PEDOT-PSS, PEDOT- O-DPDA SPAA, and PEDOT-6FDA SPAA; upon annealing, PEDOT- SPAA imidizes to PEDOT- SPI.

| Processing Temperature | | PEDOT-PSS | PEDOT-O-DPDA SPAA Example 2a. | PEDOT-6FDA SPAA Example 2b. |
|---|---|---|---|---|
| 20° C. | Conductivity (S/cm) | $3.15 \times 10^{-4}$ | $1.12 \times 10^{-4}$ | $1.83 \times 10^{-4}$ |
| | Std. Dev. | $4.03 \times 10^{-5}$ | $8.69 \times 10^{-6}$ | $7.46 \times 10^{-5}$ |
| 180° C. (90 min) | Conductivity (S/cm) | $2.65 \times 10^{-4}$ | $2.96 \times 10^{-4}$ | $4.91 \times 10^{-4}$ |
| | Std. Dev. | $3.32 \times 10^{-5}$ | $5.49 \times 10^{-6}$ | $1.42 \times 10^{-4}$ |
| 300° C. (10 min) | Conductivity (S/cm) | $<1 \times 10^{-5}$ | $6.06 \times 10^{-4}$ | $3.23 \times 10^{-4}$ |
| | Std. Dev. | $<1 \times 10^{-5}$ | $4.84 \times 10^{-5}$ | $5.76 \times 10^{-5}$ |

The conductivities of PANi-PSS, PANi-O-DPDA SPAA, and PANi-6FDA SPAA are summarized in Table 2 below.

TABLE 2

Conductivities of PANi-PSS, PANi - O-DPDA SPAA, and PANi - 6FDA SPAA; upon annealing, PANi - SPAA imidizes to PANi - SPI.

| Processing Temperature | | PANi-PSS | PANi- O-DPDA SPAA Example 2c. | PANi-6FDA SPAA Example 2d. |
|---|---|---|---|---|
| 20° C. | Conductivity (S/cm) | 12.6 | 7.74 | $7.34 \times 10^{-1}$ |
| | Std. Dev. | $4.79 \times 10^{-1}$ | 2.76 | $1.12 \times 10^{-1}$ |
| 180° C. (90 min) | Conductivity (S/cm) | 3.9 | — | — |
| | Std. Dev. | $8.46 \times 10^{-1}$ | — | — |

The effect of secondary dopants on the PEDOT-O-DPDA SPAA/PEDOT-O-DPDA SPI and PEDOT-6FDA SPAA/PEDOT-6FDA SPI systems was also investigated. Films were prepared using pristine, 5 wt. % d-sorbitol, 0.1 wt. % DMF, 0.1 wt. % Surfynol® 2502, and a combination of all three dopants. Conductivity was measured at room temperature (PEDOT-SPAA) and after annealing at 180° C. and 300° C. (PEDOT-SPI). The conductivity values for this series of experiments are listed in Tables 3 and 4. It was found that, upon annealing, films of PEDOT-O-DPDA SPI doped with d-sorbitol or DMF were observed to have a 100-fold increase in their conductivity. The values observed were comparable to commercially available PEDOT-PSS dispersions.

TABLE 3

Conductivities of secondary-doped PEDOT- O-DPDA SPAA at various processing temperatures; upon annealing, PEDOT- O-DPDA SPAA imidizes to PEDOT- O-DPDA SPI.

| Processing Temperature | | PEDOT-O-DPDA SPAA | DMF 0.1 wt. % |
|---|---|---|---|
| 20° C. | Conductivity (S/cm) | $2.04 \times 10^{-4}$ | $5.76 \times 10^{-4}$ |
| | Std. Dev. | $3.42 \times 10^{-3}$ | $6.09 \times 10^{-5}$ |
| 180° C. (10 min) | Conductivity (S/cm) | $5.83 \times 10^{-3}$ | $8.99 \times 10^{-2}$ |
| | Std. Dev. | $1.18 \times 10^{-3}$ | $8.28 \times 10^{-2}$ |
| 300° C. (10 min) | Conductivity (S/cm) | $6.47 \times 10^{-4}$ | $4.25 \times 10^{-2}$ |
| | Std. Dev. | $3.73 \times 10^{-5}$ | $2.03 \times 10^{-2}$ |

| Processing Temperature | | Surfynol® 0.1 wt. % | d-sorbitol 5 wt. % | Combination |
|---|---|---|---|---|
| 20° C. | Conductivity (S/cm) | $1.82 \times 10^{-4}$ | $4.22 \times 10^{-2}$ | $3.78 \times 10^{-4}$ |
| | Std. Dev. | $2.51 \times 10^{-5}$ | $5.84 \times 10^{-3}$ | $9.33 \times 10^{-5}$ |
| 180° C. (10 min) | Conductivity (S/cm) | $3.33 \times 10^{-4}$ | $2.00 \times 10^{-2}$ | $4.34 \times 10^{-3}$ |
| | Std. Dev. | $3.59 \times 10^{-5}$ | $3.51 \times 10^{-3}$ | $8.54 \times 10^{-4}$ |
| 300° C. (10 min) | Conductivity (S/cm) | $5.68 \times 10^{-3}$ | $6.56 \times 10^{-3}$ | $3.74 \times 10^{-3}$ |
| | Std. Dev. | $1.48 \times 10^{-3}$ | $1.50 \times 10^{-3}$ | $1.13 \times 10^{-3}$ |

TABLE 4

Conductivities of secondary-doped PEDOT- 6FDA SPAA
at various processing temperatures; upon annealing,
PEDOT- 6FDA SPAA imidizes to PEDOT-6FDA SPI.

| Processing Temperature | | PEDOT-6FDA SPAA | DMF 0.1 wt. % |
|---|---|---|---|
| 20° C. | Conductivity (S/cm) | $1.96 \times 10^{-4}$ | $1.72 \times 10^{-4}$ |
|  | Std. Dev. | $3.58 \times 10^{-5}$ | $2.55 \times 10^{-5}$ |
| 180° C. (10 min) | Conductivity (S/cm) | $2.50 \times 10^{-3}$ | $5.34 \times 10^{-3}$ |
|  | Std. Dev. | $4.39 \times 10^{-4}$ | $1.79 \times 10^{-4}$ |
| 300° C. (10 min) | Conductivity (S/cm) | $5.21 \times 10^{-4}$ | $3.91 \times 10^{-3}$ |
|  | Std. Dev. | $4.28 \times 10^{-5}$ | $5.48 \times 10^{-4}$ |

| Processing Temperature | | Surfynol ® 0.1 wt. % | d-sorbitol 5 wt. % | Combination |
|---|---|---|---|---|
| 20° C. | Conductivity (S/cm) | $3.14 \times 10^{-4}$ | $6.44 \times 10^{-2}$ | $2.78 \times 10^{-4}$ |
|  | Std. Dev. | $6.14 \times 10^{-5}$ | $6.06 \times 10^{-3}$ | $2.95 \times 10^{-5}$ |
| 180° C. (10 min) | Conductivity (S/cm) | $3.57 \times 10^{-4}$ | $2.25 \times 10^{-2}$ | $2.96 \times 10^{-3}$ |
|  | Std. Dev. | $1.94 \times 10^{-5}$ | $3.11 \times 10^{-3}$ | $8.17 \times 10^{-4}$ |
| 300° C. (10 min) | Conductivity (S/cm) | $2.10 \times 10^{-3}$ | $2.10 \times 10^{-3}$ | $1.70 \times 10^{-3}$ |
|  | Std. Dev. | $4.65 \times 10^{-4}$ | $4.65 \times 10^{-4}$ | $1.15 \times 10^{-4}$ |

The results of the effect of secondary dopants on the PANi-O-DPDA SPAA/PANi-O-DPDA SPI and PANi-6FDA SPAA/PANi-6FDA SPI systems are provided in Tables 5 and 6.

TABLE 5

Conductivities of secondary-doped PANi - O-DPDA SPAA
at various processing temperatures; upon annealing,
PANi - O-DPDA SPAA imidizes to PANi - O-DPDA SPI.

| Processing Temperature | | PANi- O-DPDA SPAA | DMF 0.1 wt. % |
|---|---|---|---|
| 20° C. | Conductivity (S/cm) | 7.74 | 2.98 |
|  | Std. Dev. | 2.76 | $6.67 \times 10^{-1}$ |
| 180° C. (10 min) | Conductivity (S/cm) | 2.88 | $9.00 \times 10^{-1}$ |
|  | Std. Dev. | $6.88 \times 10^{-1}$ | $4.17 \times 10^{-2}$ |

| Processing Temperature | | Surfynol ® 0.1 wt. % | d-sorbitol 5 wt. % | Combination |
|---|---|---|---|---|
| 20° C. | Conductivity (S/cm) | 2.83 | $9.75 \times 10^{-2}$ | $1.83 \times 10^{-1}$ |
|  | Std. Dev. | $1.56 \times 10^{-1}$ | $5.72 \times 10^{-2}$ | $3.38 \times 10^{-2}$ |
| 180° C. (10 min) | Conductivity (S/cm) | 1.37 | $7.85 \times 10^{-2}$ | $3.13 \times 10^{-2}$ |
|  | Std. Dev. | $7.72 \times 10^{-2}$ | $8.26 \times 10^{-3}$ | $9.20 \times 10^{-3}$ |

TABLE 6

Conductivities of secondary-doped PANi - 6FDA SPAA
at various processing temperatures; upon annealing,
PANi - 6FDA SPAA imidizes to PANi - 6FDA SPI.

| Processing Temperature | | PANi-6FDA SPAA | DMF 0.1 wt. % |
|---|---|---|---|
| 20° C. | Conductivity (S/cm) | $7.34 \times 10^{-1}$ | 1.47 |
|  | Std. Dev. | $1.12 \times 10^{-1}$ | $1.14 \times 10^{-1}$ |
| 180° C. (10 min) | Conductivity (S/cm) | $5.45 \times 10^{-1}$ | 1.13 |
|  | Std. Dev. | $6.95 \times 10^{-3}$ | $5.83 \times 10^{-2}$ |

| Processing Temperature | | Surfynol ® 0.1 wt. % | d-sorbitol 5 wt. % | Combination |
|---|---|---|---|---|
| 20° C. | Conductivity (S/cm) | 1.28 | $5.41 \times 10^{-2}$ | $1.66 \times 10^{-2}$ |
|  | Std. Dev. | $4.66 \times 10^{-2}$ | $2.09 \times 10^{-2}$ | $7.83 \times 10^{-3}$ |
| 180° C. (10 min) | Conductivity (S/cm) | $8.69 \times 10^{-1}$ | $1.08 \times 10^{-1}$ | $3.48 \times 10^{-2}$ |
|  | Std. Dev. | $3.27 \times 10^{-2}$ | $1.34 \times 10^{-2}$ | $1.01 \times 10^{-2}$ |

Conductivity, Drop Cast Films

The conductivity of PEDOT, PANi, and PPy each with O-DPDA SPAA, 6FDA SPAA, and PSS were all measured. The 6FDA SPAA template is less water soluble than the O-DPDA SPAA template, this was attributed as the cause for a slight decrease in conductivity for systems using this template. However, it became a dark blue dispersion faster than PEDOT-O-DPDA SPAA (5 days as opposed to 7 days) indicating that the reaction is still viable. Comparison of the same template (O-DPDA SPAA) at room temperature, the conductivities of PANi-O-DPDA SPAA, PPy-O-DPDA SPAA and PEDOT-O-DPDA SPAA were 7.74 S/cm, $3.47 \times 10^{-2}$ S/cm and $2.04 \times 10^{-4}$ S/cm, respectively. For 6FDA SPAA, the conductivities of PANi-6FDA SPAA, PPy-6FDA SPAA and PEDOT-6FDA SPAA were $7.34 \times 10^{-1}$ S/cm, $3.63 \times 10^{-3}$ S/cm and $1.96 \times 10^{-4}$ S/cm, respectively. This shows that PANi systems have higher conductivities than PPy and PEDOT systems, at room temperature.

After heat treatment, the chain alignment in the films will change due to the differences in rigidity of the poly(amic acid) and the poly(imide), leading to modified morphologies, which causes the observed conductivity enhancement. For example, after annealing at 180° C. for 10 minutes, the conductivity of PEDOT-O-DPDA SPAA was increased from $2.04 \times 10^{-4}$ S/cm to $5.83 \times 10^{-3}$ S/cm, a 10-fold enhancement, but the conductivity of PANi-O-DPDA SPAA decreased slightly from 7.74 S/cm to 2.88 S/cm. PPy-O-DPDA SPAA did not significantly change, however, (from $3.47 \times 10^{-2}$ to $5.00 \times 10^{-2}$, which is within the standard deviation for these measurements). The chain rearrangements that caused a more marked increase for the PEDOT system appear to have less of an affect on PANi and PPy.

PANi systems had higher conductivities than PPy and PEDOT systems. The conductivities of PEDOT systems were increased from $2.04 \times 10^{-4}$ to $5.83 \times 10^{-3}$ S/cm, after annealing at 180° C. for 10 min and increased from $2.04 \times 10^{-4}$ to $6.47 \times 10^{-4}$ S/cm, after annealing at 300° C. for 10 min. In the PPy systems, conductivities were increased from $3.47 \times 10^{-2}$ to $5.00 \times 10^{-2}$ S/cm only annealing at 180° C. for 10 min, but at 300° C. for 10 min the conductivities decreased from $3.47 \times 10^{-2}$ to $8.33 \times 10^{-3}$ S/cm. In the case of the PANi systems, conductivities were decreased by increasing temperature, but PEDOT-based films exhibited a 3-fold improvement after annealing at 180° C. for 90 min and also a 3-fold improvement for the O-DPDA SPAA template (from $1.02 \times 10^{-4}$ S/cm to $2.96 \times 10^{-4}$ S/cm), and a 6-fold increase from $1.02 \times 10^{-4}$ S/cm to $6.06 \times 10^{-4}$ S/cm after annealing at 300° C. for 10 min (PEDOT-O-DPDA SPAA). PANi-O-DPDA SPAA and PANi-6FDA SPAA could no longer be measured after annealing at 300° C., whereas PPy-O-DPDA SPAA and PPy-6FDA SPAA showed slightly lower conductivities. The conductivities of PPy-O-DPDA SPAA and PPy-6FDA SPAA at room temperature were $3.47 \times 10^{-2}$ S/cm and $3.63 \times 10^{-3}$ S/cm, respectively, whereas PPy-PSS was measured to be 2.47 S/cm. The highest value for PEDOT-O-DPDA SPAA was $8.99 \times 10^{-2}$ S/cm, which was doped with DMF (0.1 wt. %) and annealed at 180° C. for 10 min. The highest value for PEDOT-6FDA SPAA was $6.44 \times 10^{-2}$ S/cm, which was doped with d-sorbitol (5 wt. %). This means that the PEDOT-SPAA systems had the highest increases in conductivity (accomplished with 180° C. annealed samples upon secondary doping with common additives). For PANi systems, PANi-O-DPDA SPAA had the highest value, 7.74 S/cm, which was without heat treatment or addition of a secondary dopant; but PANi-6FDA SPAA exhibited its highest value, 1.47 S/cm, when doped with DMF (0.1 wt. %). The result of PPy systems were the same as with PEDOT systems: the conductivities were increased when doped with a secondary substance and also were annealed for a short time. The highest value for PPy-O-DPDA SPAA was $3.97 \times 10^{-1}$ S/cm and the highest value for PPy-6FDA SPAA was $1.36 \times 10^{-1}$ S/cm, which were doped with DMF (0.1 wt. %) and d-sorbitol (5 wt. %, respectively), and were both annealed at 180° C. for 10 min Thermal Stability The thermal properties of PEDOT-O-DPDA SPAA (Example 1a) and PEDOT-PSS (Comparative Example 1), in an air atmosphere, were investigated. Isothermal TGA analyses were run at a variety of temperatures for five hours in order to assess the long term thermal stability of these systems. At 300° C., the thermal stability of PEDOT-O-DPDA SPI was higher than that of PEDOT-PSS; the slope of degradation was more pronounced for PEDOT-PSS. The overall mass loss for PEDOT-O-DPDA SPAA is 10.7% after heating at 300° C. for 300 min. By comparison, PEDOT-PSS lost 33.2% of its mass under the same conditions.

Thermal stability of PEDOT-O-DPDA SPI was higher than that of PPy-O-DPDA SPI and PANi-O-DPDA SPI, respectively. The 6FDA SPI template exhibited a higher thermal stability than any of the other systems using the O-DPDA SPI. This was an expected result due to the increased thermal stability of 6FDA SPI as compared to O-DPDA SPI when not used as a template. This retention of properties should extend to other such poly(imide) systems as well. An initial weight loss observed for both (around 100° C.) is due to absorbed water. The observed weight loss at 250° C. is due to the decomposition of the sulfonic acid groups; the degradation of the polyimide backbone begins around 420° C. By comparison, the PANi system has the lowest thermal stability of the three systems analyzed by TGA.

Particle Size

The particle size of the colloidal dispersions PEDOT-PSS and PEDOT-O-DPDA SPAA were investigated by Transmission Electron Microscopy (TEM). The particle sizes for a sample of PEDOT-O-DPDA SPAA, averaged approximately 63 nm while the particle sizes for PEDOT-PSS, averaged approximately 137 nm.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to") unless otherwise noted. "Or" means and/or. Recitation of ranges of values herein are merely intended to serve as a shorthand method of referring individually to each separate value falling within the range, unless otherwise indicated herein, and each separate value is incorporated into the specification as if it were individually recited herein. All ranges disclosed herein are inclusive and combinable.

The essential characteristics of the present invention are described completely in the foregoing disclosure. One skilled in the art can understand the invention and make various modifications without departing from the basic spirit of the invention, and without deviating from the scope and equivalents of the claims, which follow. Moreover, any combination of the above-described elements in all possible variations thereof is encompassed by the invention unless otherwise indicated herein or otherwise clearly contradicted by context.

What is claimed is:

1. A conducting polymer, comprising:
an aqueous dispersion of a conducting polymer-sulfonated poly(imide) complex; or
an aqueous dispersion of a conducting polymer-sulfonated poly(amic acid) complex.

2. The polymer of claim 1, wherein the conducting polymer comprises polymerized units of thiophene, substituted thiophene, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b]furan, bithiophene, substituted bithiophene, pyrrole, substituted pyrrole, phenylene, substituted phenylene, naphthalene, substituted naphthalene, biphenyl and terphenyl and their substituted versions, phenylene vinylene, substituted phenylene vinylene, aniline, substituted aniline, a monomer according to any one of structure (I)-(XXIX)

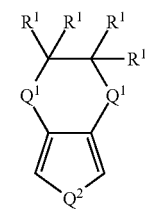

(I)

wherein each occurrence of $Q^1$ is independently S or O; $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

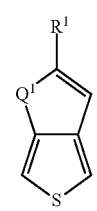

(II)

-continued

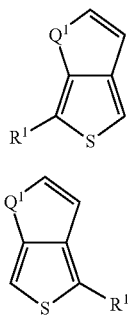
(III)

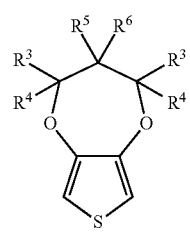
(IV)

wherein $Q^1$ is S, O, or Se; and $R^1$ is hydrogen, $C_1$-$C_{12}$ alkyl, $C_1$-$C_{12}$ haloalkyl including perfluoroalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(V)

wherein each instance of $R^3$, $R^4$, $R^5$, and $R^6$ independently is hydrogen; optionally substituted $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, —$C_1$-$C_{10}$ alkyl-aryl; or hydroxyl;

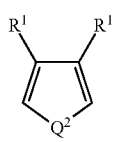
(VI)

wherein $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

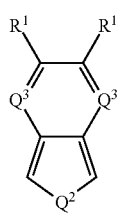
(VII)

wherein $Q^2$ is S, O, or N—$R^2$ wherein $R^2$ is hydrogen or $C_1$-$C_6$ alkyl; each occurrence of $Q^3$ is independently CH or N; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(VIII)

wherein $Q^1$ is S or O;

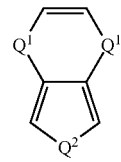
(IX)

wherein $Q^2$ is S, O, or N—$R^2$ wherein $R^2$ is hydrogen or $C_1$-$C_6$ alkyl; and each occurrence of $Q^1$ is independently S or O;

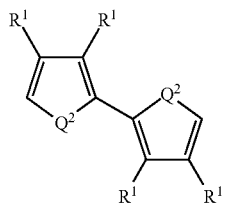
(X)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

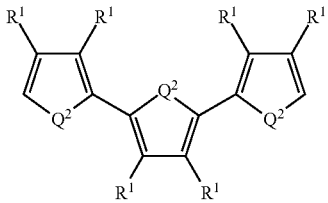
(XI)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

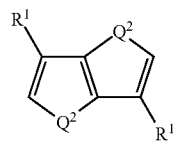
(XII)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

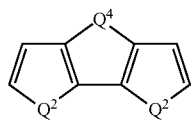

(XIII)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

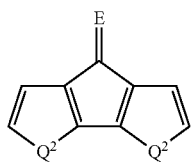

(XIV)

wherein each occurrence of $Q^2$ is independently S, O, or N—$R^2$ wherein $R^2$ is hydrogen or $C_1$-$C_6$ alkyl; and E is O or $C(R^7)_2$, wherein each occurrence of $R^7$ is an electron withdrawing group;

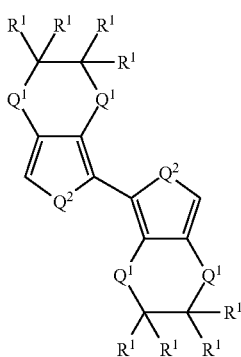

(XV)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

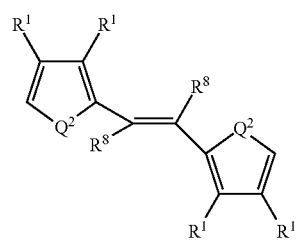

(XVI)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano;

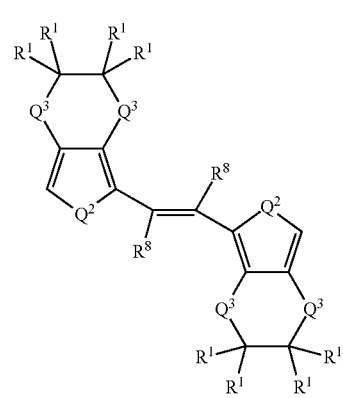

(XVII)

wherein each occurrence of $Q^3$ is independently $CH_2$, S, or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano;

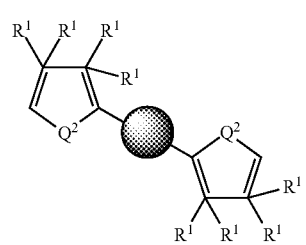

(XVIII)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and ● represents an aryl;

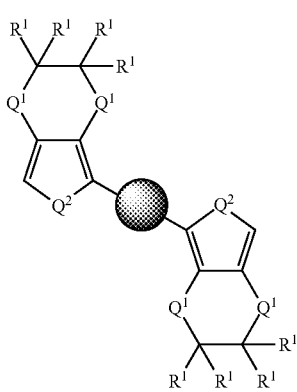
(XIX)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and ● represents an aryl;

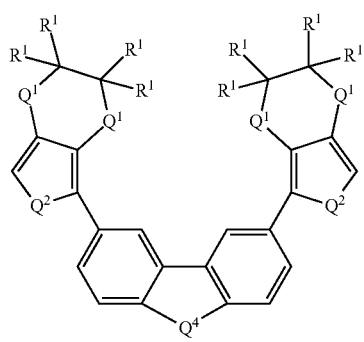
(XX)

wherein each occurrence of $Q^1$ is independently S or O; each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

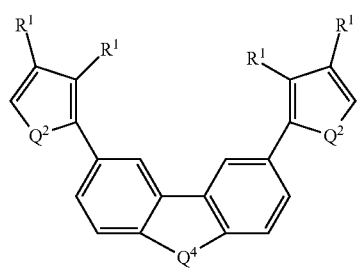
(XXI)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

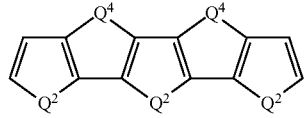
(XXII)

wherein each occurrence of $Q^2$ is independently S, O, or N—$R^2$ wherein $R^2$ is hydrogen or $C_1$-$C_6$ alkyl; each occurrence of $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

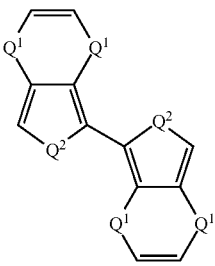
(XXIII)

wherein each occurrence of $Q^2$ is independently S, O, or N—$R^2$ wherein $R^2$ is hydrogen or $C_1$-$C_6$ alkyl; and each occurrence of $Q^1$ is independently S or O;

(XXIV)

wherein $Q^2$ is S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-aryl, —$C_1$-$C_6$ alkyl-O-aryl, or —$C_1$-$C_6$ alkyl-O-aryl;

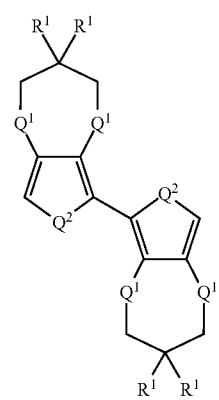
(XXV)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

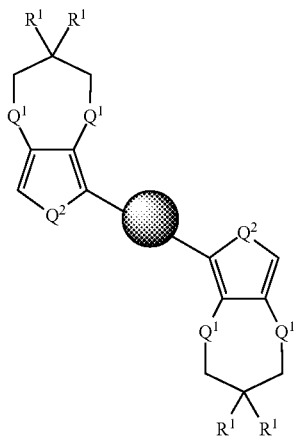

(XXVI)

wherein each occurrence of $Q^2$ is independently S, O, or N—$R^2$ wherein $R^2$ is hydrogen or $C_1$-$C_6$ alkyl; each occurrence of $Q^1$ is independently S or O; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and ● represents an aryl;

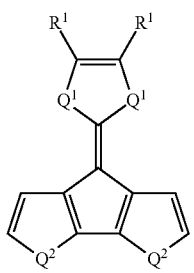

(XXVII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

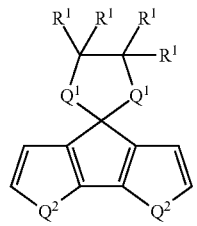

(XXVIII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(XXIX)

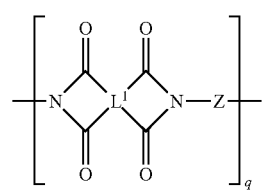

wherein g is 0, 1, 2, or 3; and each occurrence of $R^9$ is independently $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-O-aryl, or N—$R^2$ wherein $R^2$ is hydrogen or $C_1$-$C_6$ alkyl;

or a combination thereof.

3. The polymer of claim 1, wherein the conducting polymer comprises polymerized units of 3,4-ethylenedioxythiophene, aniline, substituted aniline, pyrrole, substituted pyrrole, thieno[3,4-b]thiophene, substituted thieno[3,4-b]thiophene, thieno[3,4-b]furan, or substituted thieno[3,4-b]furan.

4. The polymer of claim 1, wherein the sulfonated poly (imide) comprises the structure (A)

(A)

$$\left[ \begin{array}{c} O \\ \parallel \\ N \\ \parallel \\ O \end{array} \begin{array}{c} O \\ \parallel \\ L^1 \\ \parallel \\ O \end{array} \begin{array}{c} \\ N-Z \\ \end{array} \right]_q$$

wherein
$L^1$ is an arylene or substituted arylene;
Z is a an arylene or substituted arylene comprising one, two, or more sulfonic acid groups; and
q is about 10 to about 1000.

5. The polymer of claim 4, wherein L¹ is

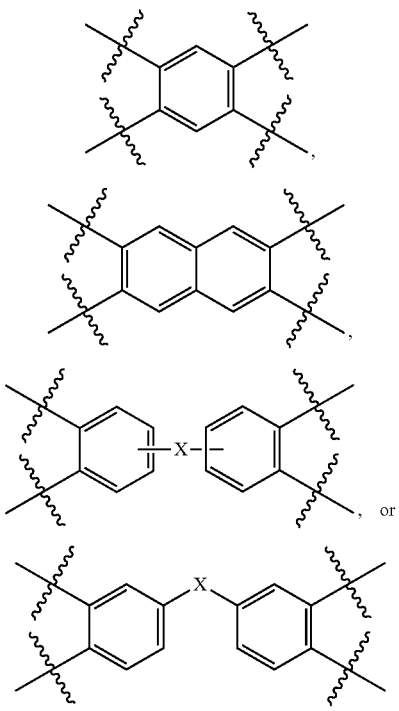

wherein
X is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O); and
Z is

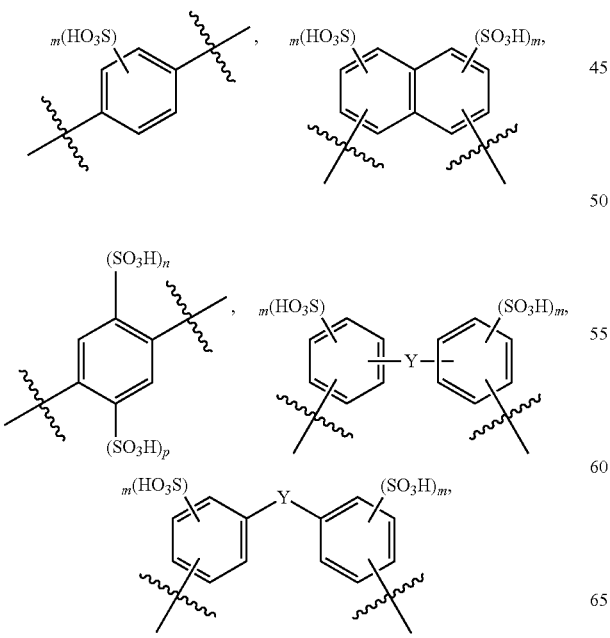

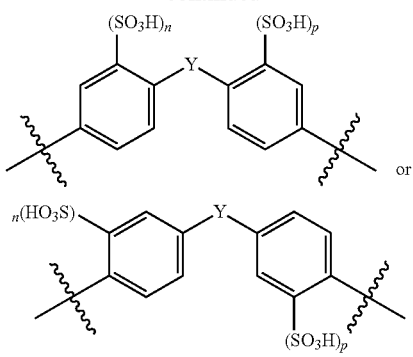

wherein
n is 1;
m is 0, 1, or 2 with the proviso that the diamine comprises at least one sulfonic acid group;
p is 0 or 1; and
Y is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O).

6. The polymer of claim 4, wherein L¹ is

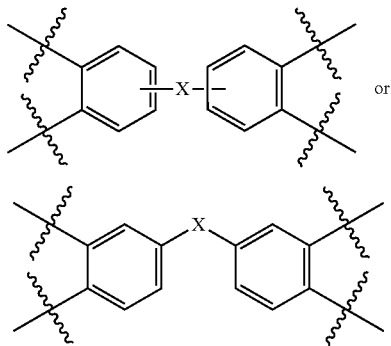

wherein
X is a $C_1$-$C_6$ haloalkyl or O; and
Z is

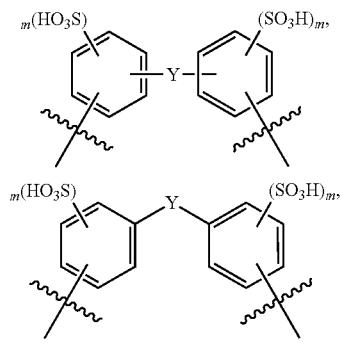

wherein n is 1;

m is 1;

p is 1; and

Y is a O.

7. The polymer of claim 1, wherein the sulfonated poly(amic acid) comprises the structure (B)

wherein

L² is an arylene or substituted arylene;

Z is a an arylene or substituted arylene comprising one, two, or more sulfonic acid groups; and q is about 10 to about 1000.

8. The polymer of claim 7, wherein

L² is wherein

X is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O); and Z is wherein n is 1;

m is 0, 1, or 2 with the proviso that the diamine comprises at least one sulfonic acid group;

p is 0 or 1; and

Y is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O).

9. The polymer of claim 7, wherein L² is

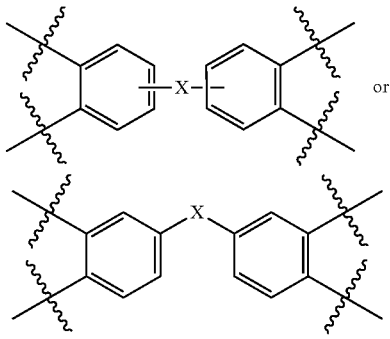

or

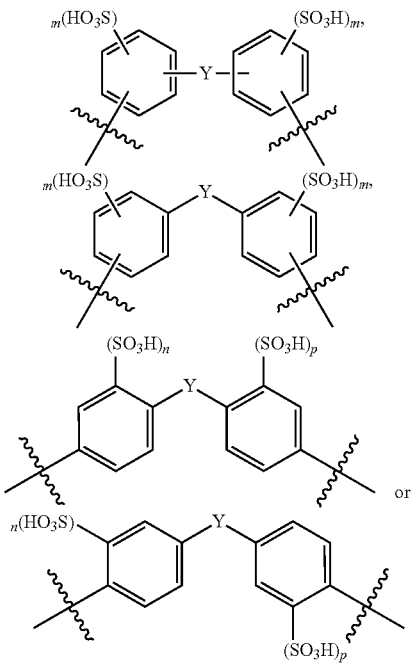

wherein
X is a $C_1$-$C_6$ haloalkyl or O; and
Z is wherein
n is 1;
m is 1;
p is 1; and
Y is O.

10. The polymer of claim 1, further comprising a dopant.

11. A method of making a conducting polymer, comprising:
polymerizing a conducting monomer in the presence of a sulfonated poly(amic acid) and an oxidant in an aqueous solvent to form an aqueous dispersion comprising a conducting polymer-sulfonated poly(amic acid) complex.

12. The method of claim 11, further comprising annealing the conducting polymer-sulfonated poly(amic acid) complex to form a conducting polymer-sulfonated poly(imide) complex.

13. The method of claim 12, wherein the annealing is conducted at a temperature greater than 150° C.

14. The method of claim 12, wherein the conducting polymer-sulfonated poly(amic acid) complex is prepared into a film prior to annealing.

15. The method of claim 11, wherein the conducting monomer is a thiophene, substituted thiophene, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b]furan, bithiophene, substituted bithiophene, pyrrole, substituted pyrrole, phenylene, substituted phenylene, naphthalene, substituted naphthalene, biphenyl and terphenyl and their substituted versions, phenylene vinylene, substituted phenylene vinylene, aniline, substituted aniline, a monomer according to any one of structure (I)-(XXIX)

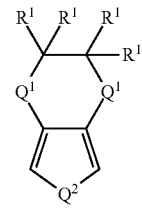
(I)

wherein each occurrence of $Q^1$ is independently S or O; $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

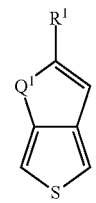
(II)

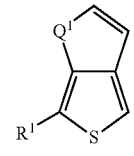
(III)

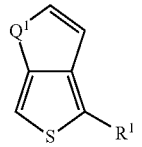
(IV)

wherein $Q^1$ is S, O, or Se; and $R^1$ is hydrogen, $C_1$-$C_{12}$ alkyl, $C_1$-$C_{12}$ haloalkyl including perfluoroalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

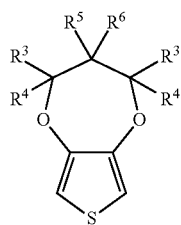
(V)

wherein each instance of $R^3$, $R^4$, $R^5$, and $R^6$ independently is hydrogen; optionally substituted $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, —$C_1$-$C_{10}$ alkyl-aryl; or hydroxyl;

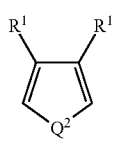
(VI)

wherein $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

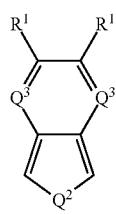
(VII)

wherein $Q^2$ is S, O, or N—$R^2$ wherein $R^2$ is hydrogen or $C_1$-$C_6$ alkyl; each occurrence of $Q^3$ is independently CH or N; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(VIII)

wherein $Q^1$ is S or O;

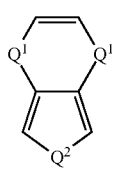
(IX)

wherein $Q^2$ is S, O, or N—$R^2$ wherein $R^2$ is hydrogen or $C_1$-$C_6$ alkyl; and each occurrence of $Q^1$ is independently S or O;

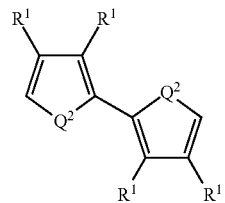
(X)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(XI)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

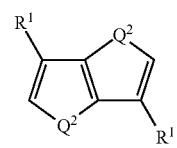
(XII)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

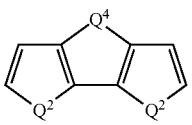
(XIII)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

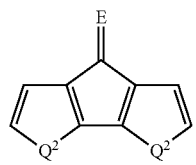
(XIV)

wherein each occurrence of $Q^2$ is independently S, O, or N—$R^2$ wherein $R^2$ is hydrogen or $C_1$-$C_6$ alkyl; and E is O or $C(R^7)_2$, wherein each occurrence of $R^7$ is an electron withdrawing group;

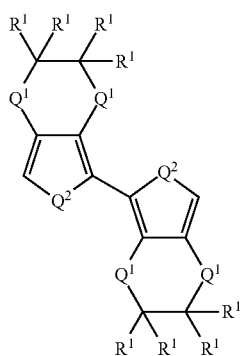
(XV)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

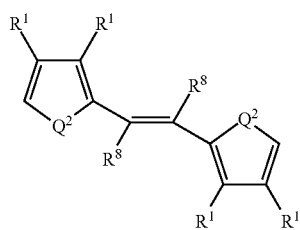
(XVI)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano;

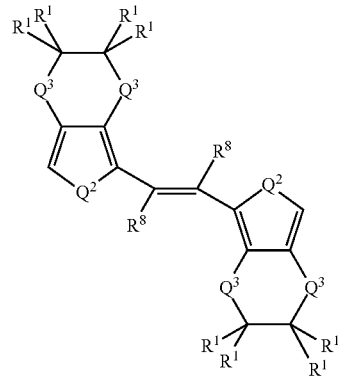
(XVII)

wherein each occurrence of $Q^3$ is independently $CH_2$, S, or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano;

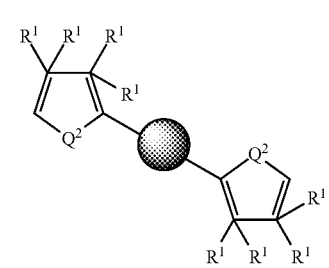
(XVIII)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and ⬤ represents an aryl;

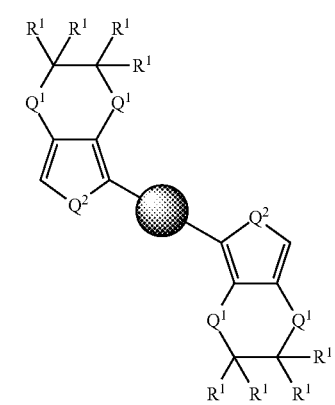
(XIX)

wherein each occurrence of $Q^1$ is independently S or O; each occurrence of $Q^2$ is independently S, O, or N—$R^2$ wherein R² is hydrogen or C₁-C₆ alkyl; each occurrence of R¹ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and ● represents an aryl;

(XX)

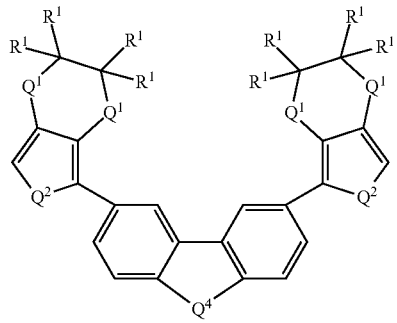

wherein each occurrence of $Q^1$ is independently S or O; each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(XXI)

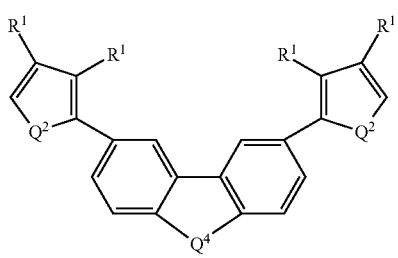

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(XXII)

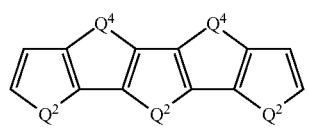

wherein each occurrence of $Q^2$ is independently S, O, or N—$R^2$ wherein $R^2$ is hydrogen or $C_1$-$C_6$ alkyl; each occurrence of $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

(XXIII)

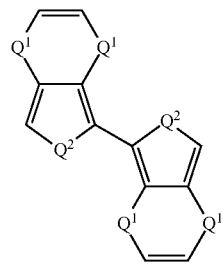

wherein each occurrence of $Q^2$ is independently S, O, or N—$R^2$ wherein $R^2$ is hydrogen or $C_1$-$C_6$ alkyl; and each occurrence of $Q^1$ is independently S or O;

(XXIV)

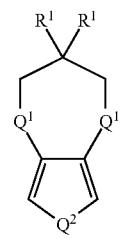

wherein $Q^2$ is S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-aryl, —$C_1$-$C_6$ alkyl-O-aryl, or —$C_1$-$C_6$ alkyl-O-aryl;

(XXV)

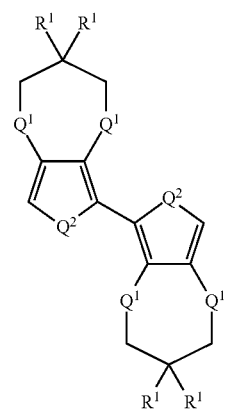

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

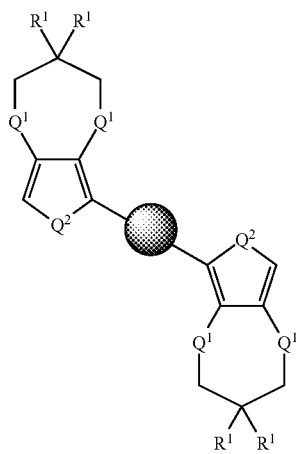

(XXVI)

wherein each occurrence of $Q^2$ is independently S, O, or N—$R^2$ wherein $R^2$ is hydrogen or $C_1$-$C_6$ alkyl; each occurrence of $Q^1$ is independently S or O; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and ● represents an aryl;

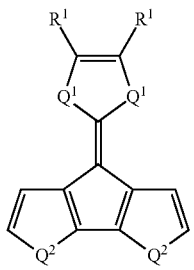

(XXVII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

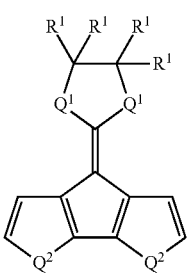

(XXVIII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;

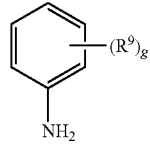

(XXIX)

wherein g is 0, 1, 2, or 3; and each occurrence of $R^9$ is independently $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-O-aryl, or N—$R^2$ wherein $R^2$ is hydrogen or $C_1$-$C_6$ alkyl;

or a combination thereof.

16. The method of claim 15, wherein the conducting monomer is 3,4-ethylenedioxythiophene, aniline, substituted aniline, pyrrole, substituted pyrrole, thieno[3,4-b]thiophene, substituted thieno[3,4-b]thiophene, thieno[3,4-b]furan, or substituted thieno[3,4-b]furan.

17. The method of claim 11, wherein the sulfonated poly(amic acid) is prepared by reacting a sulfonated diamine with a dianhydride.

18. The method of claim 17, wherein the sulfonated diamine is

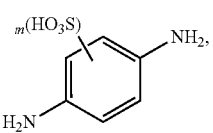 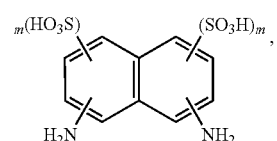

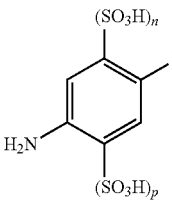 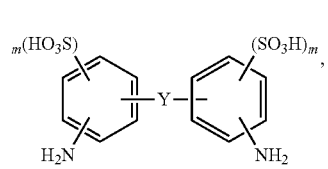

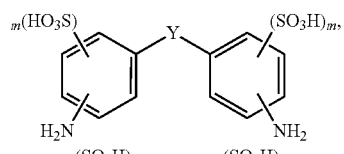

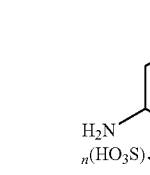 or

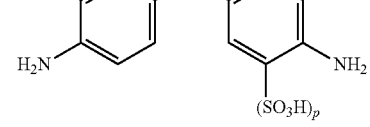

wherein n is 1;

m is 0, 1, or 2 with the proviso that the diamine comprises at least one sulfonic acid group;

p is 0 or 1; and

Y is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O); and the dianhydride is

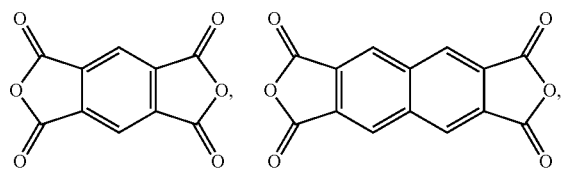

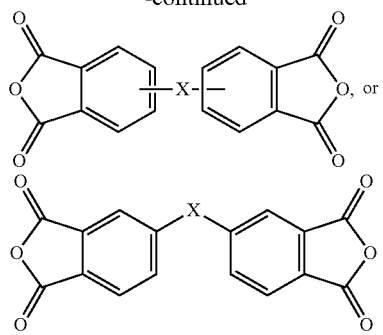

wherein

X is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O).

* * * * *